US007171021B2

(12) United States Patent
Yoshida et al.

(10) Patent No.: US 7,171,021 B2
(45) Date of Patent: Jan. 30, 2007

(54) DATA PROCESSING APPARATUS AND METHOD, AND STORAGE MEDIUM THEREFOR

(75) Inventors: Jun Yoshida, Yokohama (JP); Keiichi Iwamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/078,376

(22) Filed: Mar. 14, 2005

(65) Prior Publication Data

US 2005/0185820 A1    Aug. 25, 2005

Related U.S. Application Data

(62) Division of application No. 09/440,467, filed on Nov. 15, 1999, now abandoned.

(30) Foreign Application Priority Data

| Nov. 20, 1998 | (JP) | 10-330837 |
| Nov. 20, 1998 | (JP) | 10-330838 |
| Nov. 20, 1998 | (JP) | 10-330839 |
| Nov. 27, 1998 | (JP) | 10-337259 |

(51) Int. Cl.
*G06K 9/00* (2006.01)
(52) U.S. Cl. .................. 382/100; 713/176
(58) Field of Classification Search .............. 382/100; 713/176

See application file for complete search history.

(56) References Cited

U.S. PATENT DOCUMENTS

| 5,216,724 A | 6/1993 | Suzuki et al. |
| 5,600,720 A | 2/1997 | Iwamura et al. |
| 5,636,292 A | 6/1997 | Rhoads |
| 5,666,419 A | 9/1997 | Yamamoto et al. |
| 5,825,892 A | 10/1998 | Braudaway et al. |
| 5,937,395 A | 8/1999 | Iwamura |
| 5,999,947 A * | 12/1999 | Zollinger et al. ........... 707/203 |
| 6,005,936 A * | 12/1999 | Shimizu et al. ............. 713/176 |
| 6,115,818 A | 9/2000 | Barton |
| 6,334,187 B1 | 12/2001 | Kadono |
| 6,449,377 B1 | 9/2002 | Rhoads |
| 6,504,941 B2 | 1/2003 | Wong |

OTHER PUBLICATIONS

"On an Experimental Evaluation of Steganography with Wavelength Transform", H. Ishizuka, et al., The Institute of electronics, Information and Communication Engineers, The 1997 Symposium on Cryptography and Information Security, Jan. 29-Feb. 1, 1997, Japan.

(Continued)

*Primary Examiner*—Jingge Wu
*Assistant Examiner*—Shefali Patel
(74) *Attorney, Agent, or Firm*—Fitzpatrick, Cella, Harper & Scinto

(57) ABSTRACT

The primary objective of the present invention is the prevention, or the detection, of an illegal act involving digital contents. To achieve this objective, whether an illegal procedure involving digital contents has been performed is determined based on results obtained by performing a predetermined operation for at least a part of the digital contents, and a predetermined process is performed for the digital contents in accordance with the results of determination.

6 Claims, 18 Drawing Sheets

OTHER PUBLICATIONS

"A Method of Watermarking under Frequency Domain for Protecting Copyright of Digital Image", T. Nakamura, et al., The Institute of Electronics, Information and Communication Engineers, The 1997 Symposium on Cryptography and Information Security, Jan. 20-Feb. 1, 1997, Japan.

"A Watermarking Scheme to Image Data by PN Sequence", J. Ohnishi, et al., The Institute of Electronics, Information and communication Engineers, The 1997 Symposium on Cryptography and Information Security, Jan. 29-Feb. 1, 1997, Japan.

* cited by examiner

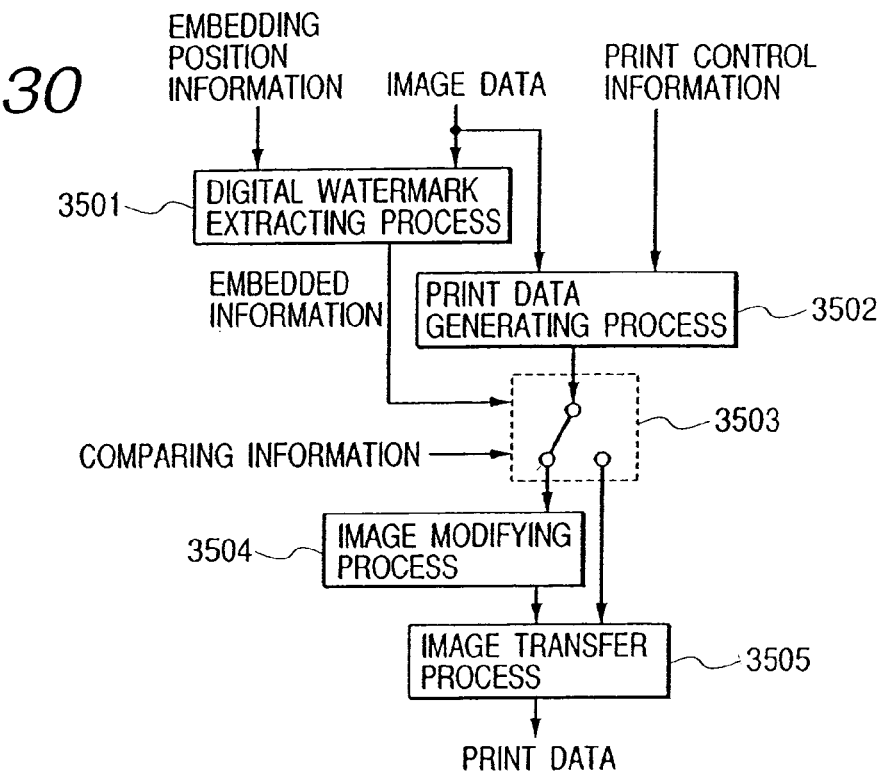
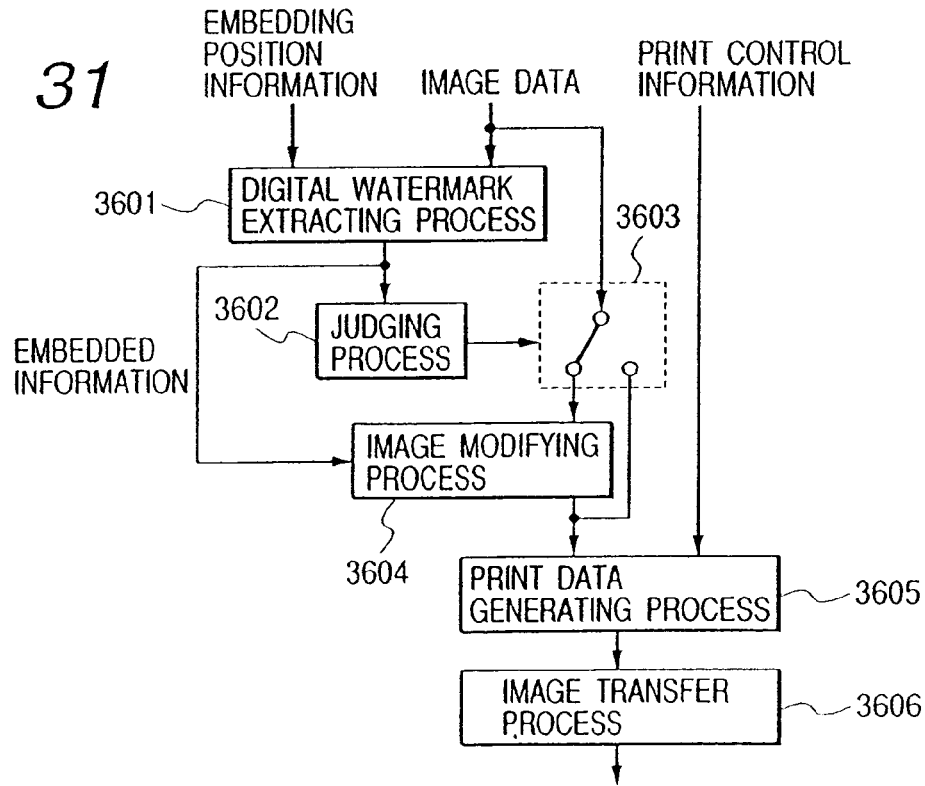

DATA PROCESSING APPARATUS AND METHOD, AND STORAGE MEDIUM THEREFOR

This application is a division of application Ser. No. 09/440,467 filed Nov. 15, 1999 now abandoned.

BACKGROUND OF THE INVENTION

1. Field of the Invention

The present invention relates to a data processing apparatus and a processing method for preventing the use of digital data for illegal (injustice) activities, and to a storage medium on which the data processing method is stored.

2. Related Background Art

Compared to conventional analog data, digital data is not easily degraded when it is copied or altered by a computer, and it is easily transmitted over a communication line. Because of these characteristics, the illegal copying and redistribution of digital data tend to occur fairly often.

One method that is used to prevent these illegal activities is called digital watermarking. According to this method, digital watermark information is embedded in such a manner that when digital contents having an embedded digital watermark are normally reproduced, the watermark can not be discerned by an observer.

For the purposes of this document, digital contents are static pictures, moving pictures, sounds, computer programs and computer data.

A typical method used for embedding digital watermark information is one whereby, to embed a digital watermark, the level of brightness or the chromaticity of each pixel constituting a color image is computed.

The method disclosed in U.S. Pat. No. 5,636,292, for example, is a well known example of the above method. According to this method, digital contents are divided into blocks, and a watermark pattern that includes the coefficients +1 and −1 is added to each block to implement the embedding of a digital watermark.

Another well known embedding method is one for which frequency transformations, such as fast Fourier transforms, discrete cosine transforms or wavelet transforms, are performed, and for which digital watermark information is added to frequency areas and inverse frequency transformations are used.

According to the method for which fast the Fourier transforms are used, a PN series is added to input digital contents and the resultant digital contents are distributed and divided into blocks. A Fourier transform is performed for each block, and one bit of watermark information is embedded in one block. An inverse Fourier transform is performed for a block in which the watermark information is embedded, and the same PN series as was added at first is added to the block, so that digital contents in which a digital watermark has been embedded can be obtained. This method is described in detail in "Watermarking Method For Images Using PN Series", Onishi, Oka and Matsui, 1997 Cryptography and information security symposium lecture theses, SCIS97-26B.

According to the method for which the discrete cosine transforms are used, digital contents are divided into blocks, and a discrete cosine transform is performed for each block. Then, one bit of watermark information is embedded in one block, and an inverse transform is performed for the block to generate digital contents in which a digital watermark has been embedded. This method is described in detail in "Digital Watermarking Method In Frequency Area To Protect Copyright of Digital Image," Nakamura, Ogawa and Takashima, 1997 Cryptography and information security symposium lecture theses, SCIS97-26A.

According to the method for which the wavelet transforms are used, it is not necessary to divide into blocks the digital contents that are input. This method is described in detail in "Experimental Study Concerning Safety And Reliability For Digital Watermarking Technique Using Wavelet Transform", Ishizuka, Sakai and Sakurai, 1997 Cryptography and information security symposium lecture theses, SCIS97-26D.

The typical digital watermark information that is embedded using the above methods is copyright information and user information. When copyright information has been embedded in original digital contents, users thereafter not only know that the pertinent digital contents are copyrighted but also know the name of the copyright owner.

Further, when user information has also been embedded, a user who illegally redistributes the pertinent digital contents can be identified.

The conventional digital watermarking technique, however, is a passive protection measure, merely imparting information concerning the prohibition of an illegal act, and a method that can actively and effectively prevent or detect an illegal act has not yet been established.

SUMMARY OF THE INVENTION

To resolve the above shortcomings, the primary objective of the present invention is the prevention, or the detection, of an illegal act involving digital contents.

To achieve the above objective, according to the preferred embodiments of the present invention, a data processing apparatus comprises:

a detection unit for detecting whether an illegal process has been performed for input digital contents on the basis of a result obtained by performing a predetermined operation for at least a part of the digital contents; and a processing unit for, when the detection means detects that the illegal process has been performed, performing a predetermined process for the digital contents.

Furthermore, a data processing apparatus comprises:

an operation unit for performing a predetermined calculation using data values that constitute input digital contents and that are included in a first sub-set;

an extraction unit for extracting information that is embedded as a digital watermark in a second sub-set composed of the data values that constitute the digital contents; and a comparison unit for comparing the value obtained through the predetermined calculation with the information that is extracted.

Further, a data processing apparatus comprises:

an operation unit for performing a predetermined calculation using data values that constitute input digital contents and that are included in a first sub-set; and an embedding unit for embedding a result obtained by the predetermined calculation in a second sub-set composed of the data values that constitute the digital contents.

In addition, a data processing apparatus comprises:

an embedding unit for embedding, in digital contents, a digital watermark that includes a time whereat the digital contents were prepared; and a file preparation unit for preparing a file that accompanies the digital contents and for writing in the file a file update time.

Further, a data processing apparatus comprises:

an extraction unit for extracting a digital contents preparation time, from digital contents in which information indicating the digital contents preparation time is embedded as a digital watermark, and a digital contents update time, from a file in which the digital contents update time is written; and a comparison unit for comparing the preparation time with the update time.

The other objectives and features of the present invention will become apparent during the course of the explanation of the embodiments, which is given while referring to the following drawings.

BRIEF DESCRIPTION OF THE DRAWINGS

FIG. 30 is a diagram showing the process performed by a data output controller according to an eighteenth embodiment of the present invention;

FIG. 31 is a diagram showing the process performed by a data output controller according to a nineteenth embodiment of the present invention;

DETAILED DESCRIPTION OF THE PREFERRED EMBODIMENTS

The preferred embodiments of the present invention will now be described in order.

(First Embodiment)

The individual embodiments of the present invention will be explained while referring to the accompanying drawings.

Figure 1:
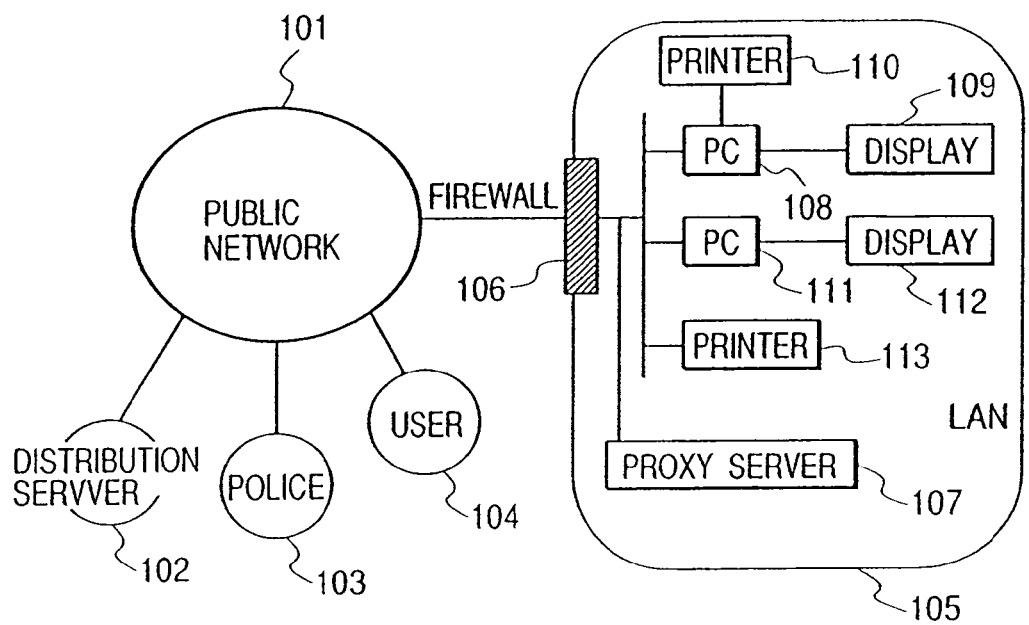
FIG. 1 is a diagram showing the arrangement of one system that comprises a general public network and peripheral devices.

FIG. 1 is a diagram illustrating the configuration of a general network, and an example environment for the employment of the present invention. The Internet is a typical example of a public network 101.

A distribution server 102, which distributes and sells such digital contents as digital images, police organizations 103, users 104 and local area networks (LANs) 105, is connected to the public network 101.

The distribution server 102 is generally constituted by a World Wide Web server (Web server). The LAN 105 is shielded from external access by a fire wall 106, and only communications having predetermined parameters, such as signals originating at specific transmitters or certain types of transmission data, are permitted to pass between the LAN 105 and the public network 101.

A proxy server 107, a personal computer (PC) 108, a display device 109 connected to the PC 108, a printer 110, another PC 111, a display device 112 connected to another PC 111, and a printer 113 connected directly to the LAN 105 are included in the LAN 105. The proxy server 107 exercises control when the PCs 108 and 111 in the LAN 105 access a Web server, such as the distribution server 102, and all the data exchanged by the PC 108 or 111 and the server 102 must pass through the proxy server 107.

Figure 2:
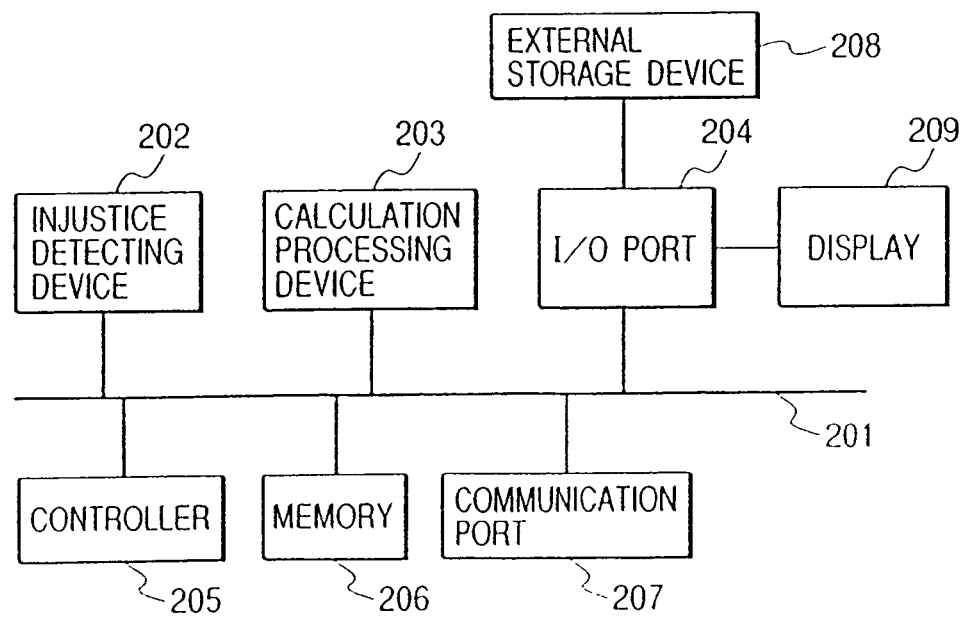
FIG. 2 is a diagram showing an example arrangement for a proxy server.

FIG. 2 is a diagram showing an example system for the proxy server 107, which has a copyright protection function according to the first embodiment.

The system comprises a bus 201, which is used for the to exchange of data by the devices of the system; an illegality detecting device 202; a calculation processing device 203, which is operated in accordance with the detection results obtained by the illegality detecting device 202; an I/O port 204; a controller 205, for controlling the individual devices; a memory 206, in which digital contents input to the system are temporarily stored; a communication port 207, which is connected to an external network, such as the LAN 105; an external storage device 208, which is connected to the I/O port 204; and a display device 209.

The illegality detecting device 202 detects digital watermark information that is embedded in advance in digital contents by a digital watermark embedding device, and identifies illegal procedures that have been employed for the digital contents. When the digital watermark embedding device is mounted in an image input device, such as a digital camera or a scanner, the illegality detecting device 202 can detect the performance of an illegal act that involves digital contents obtained by the image input device.

When digital contents are prepared by a computer in which the digital watermark embedding device is mounted, or by application software, the illegality detecting device 202 can detect the performance of an illegal act that involves the digital contents. For this purpose, the digital watermark embedding device may also be mounted on a storage device, a distribution server or a network device.

In the system for this embodiment, digital contents to be examined are transmitted across the LAN 105, and/or the LAN 105 and the public network 101, and read at the communication port 207, and are stored temporarily in the memory 206. The digital contents in the memory 206 are then transmitted to the illegality detecting device 202 to determine whether they are legal. If the illegality detecting device 202 determines that the digital contents are legal, the digital contents are then distributed via the communication port 207 to the entity that requested the distribution of the pertinent digital contents.

When the illegality detecting device 202 determines that an illegal procedure has been performed for the digital contents, the calculation processing device 203 performs one or more of the following processes.

(1) The calculation processing device 203 performs, for the digital contents, a visible/invisible digital watermark embedding process, such as filtering, encryption, scrambling or the addition of noise. Then, the resultant digital contents are output via the communication port 207 to the entity that requested the distribution of the digital contents.

(2) The calculation processing device 203 writes information concerning the source of the digital contents, information concerning an entity that has read the digital contents, and/or information concerning the digital contents, such as the name of the digital contents, via the external storage device 208 connected to the I/O port 204, and/or via the communication port 207, to the databases located at the distribution server 102 and the police organization 103.

(3) The controller 205 halts the output.

(4) The calculation processing device 203 issues an alarm message, and displays it on the display device 209 connected to the I/O port 204. A system that issues, via the communication port 207, a warning across a network to the source of digital contents, or a third party, can be easily constructed.

An explanation will now be given for the illegality detection method employed by the illegality detecting device 202.

Since the method employed for this embodiment is one that uses a hash value, first, an explanation will be given for a hash value.

A hash value h is a short output h constituting a compressed value for a long input series x that is obtained by using a hash function f: x→h. The hash function is a unidirectional function, and one of its properties is that it is difficult to obtain different inputs x and x' that satisfy f(x')=f(x). A typical hash function is an MD5 (Message Digest5) or an SHA (Secure Hash Algorithm). Hash functions are described in detail in "Guide to Cryptography Theory", Eiji Okamoto, Kyoritsu Publishing Co., Ltd.

First, a sub-set is selected as a target for a hash function and another sub-set is selected as an embedded target, and the two are extracted from digital contents. Then, a hash value is calculated as a data value for the target sub-set for the hash function.

When the data value for the sub-set is changed, it does not match the obtained hash value. In order to save the obtained hash value without it being separated from the digital contents, a hash value embedded as a digital watermark is extracted from the sub-set that is the embedded target. The above calculated hash value is compared with the extracted hash value, and when the two match, from this it is ascertained that the digital contents are legal. According to the illegality detection method of the present invention, if the sub-set for a hash function is altered, and if a sub-set for embedding is altered so much that a digital watermark can not be extracted normally, it is ascertained that the relevant digital contents are illegal.

In order to improve the detection accuracy, a data value that belongs to a hash target sub-set and a data value that belongs to an embedding target sub-set may be alternately arranged.

As an example, when a digital image is employed as digital contents, a pixel for a hash target sub-set and a pixel for an embedding target sub-set are alternately arranged for each raster (horizontal bit string) or for a vertical bit string, or are arranged using a zigzag pattern for each bit or bit string, or for each rectangle in the relevant digital contents. In this case, if the sum of the hash target sub-set and the embedding target sub-set matches the entire digital contents, an alteration of the digital contents can be detected.

A partial alteration of the digital contents can be detected in the following manner. A hash value is calculated for each object or for each part of the digital contents, and is embedded in another object or another part, so that the alteration of each object or of each part can be detected.

An explanation will now be described for a case wherein the illegality detecting device 202 and a digital watermarking device are constituted by hardware. It should be noted that the illegality detecting device 202 and the digital watermarking device can also be easily implemented by a computer system configuration using a software application.

Figure 3:
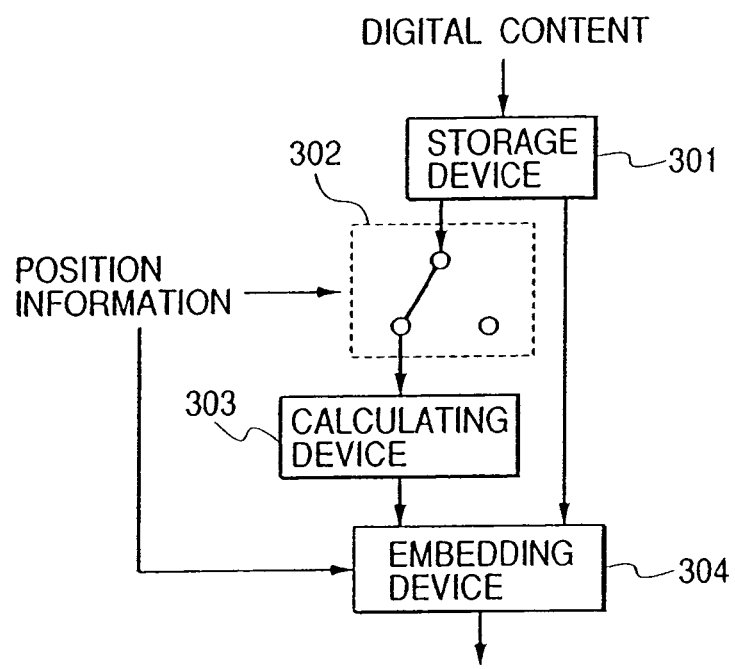
FIG. 3 is a diagram showing a digital watermark embedding device according to a first embodiment of the present invention.

FIG. 3 is a block diagram illustrating a digital watermarking device according to the first embodiment of the present invention.

The data that are input to this device are digital contents and positional information that is represented by a set of coordinates. The digital watermarking device comprises: a storage device 301; a switch 302, which is controlled in accordance with positional information and which is used to extract a data value for a hash target sub-set from digital contents; a calculating device 303, which calculates a hash value using the data value of the hash target sub-set in the digital contents that are separated into two segments; and an embedding device 304, which embeds the obtained hash value as a digital watermark in the second segment of the digital contents. The positional information is information that is represented by a coordinate location that indicates where a watermark is to be embedded.

The data values for the input digital contents are stored temporarily in the storage device 301 for a time lag adjustment, following which the data values are transmitted to the switch 302 and positional information is employed to extract a hash target sub-set for which a hash value is to be calculated. Thereafter, the hash target sub-set is transmitted to the calculating device 303, and a hash value obtained by the calculating device 303 is transmitted to the embedding device 304 and embedded as a digital watermark in the digital contents in the storage device 301.

For this process, the digital watermark is embedded in accordance with the positional information, and a watermarking target is a data value in the embedding target sub-set. Further, since the embedding target sub-set does not overlap the hash target sub-set, the embedding of a digital watermark does not change a hash value that is calculated using the data value included in the hash target sub-set of the digital contents.

Figure 4:
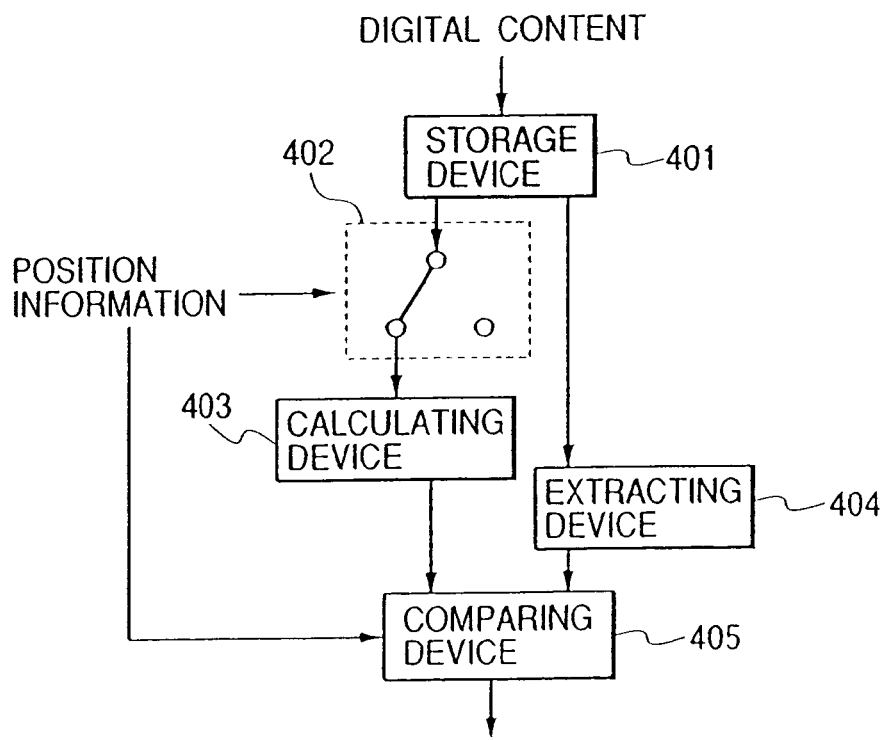
FIG. 4 is a diagram showing an illegality detecting device according to the first embodiment.

FIG. 4 is a block diagram showing the illegality detecting device 202 according to the first embodiment.

The data that are input to the illegality detecting device 202 are digital contents to be examined, and the same positional information as that which was provided for the digital watermarking device in FIG. 3. The illegality detecting device 202 comprises: a storage device 401, for making a time lag adjustment; a switch 402, which is controlled in accordance with positional information and is used to extract, from data values for input digital contents, a hash target sub-set in which a digital watermark is not embedded; a calculating device 403, which employs the same method as that used for the device in FIG. 3 to calculate a hash value using a data value included in the hash target sub-set of the digital contents; a digital watermark extracting device 404, which extracts, from the digital contents, a hash value that is embedded as a digital watermark; and a comparing device 405, which compares the hash value obtained from the hash target sub-set with the hash value extracted from the digital contents.

The digital contents that are input to the illegality detecting device 202 are stored temporarily in the storage device 401, following which they are transmitted to the switch 402 and a hash target sub-set used for hash calculation is extracted from the digital contents in accordance with the same position information as was provided for the device in FIG. 3. Thereafter, the hash target sub-set is transmitted to the calculating device 403 and a hash value is obtained. In addition, the digital contents stored in the storage device 401 are transmitted with positional information to the digital watermark extracting device 404, and a hash value is extracted from the digital contents.

The hash value obtained by the calculating device 403 and the hash value extracted by the extracting device 404 are transmitted to the comparing device 405, where they are compared. When the two hash values match, the result of the comparison output by the comparing device 405 indicates that the digital contents are legal. But when the two hash values do not match, the result of the comparison output by the comparing device 405 indicates that the digital contents are illegal.

(Second Embodiment)

Figure 5:
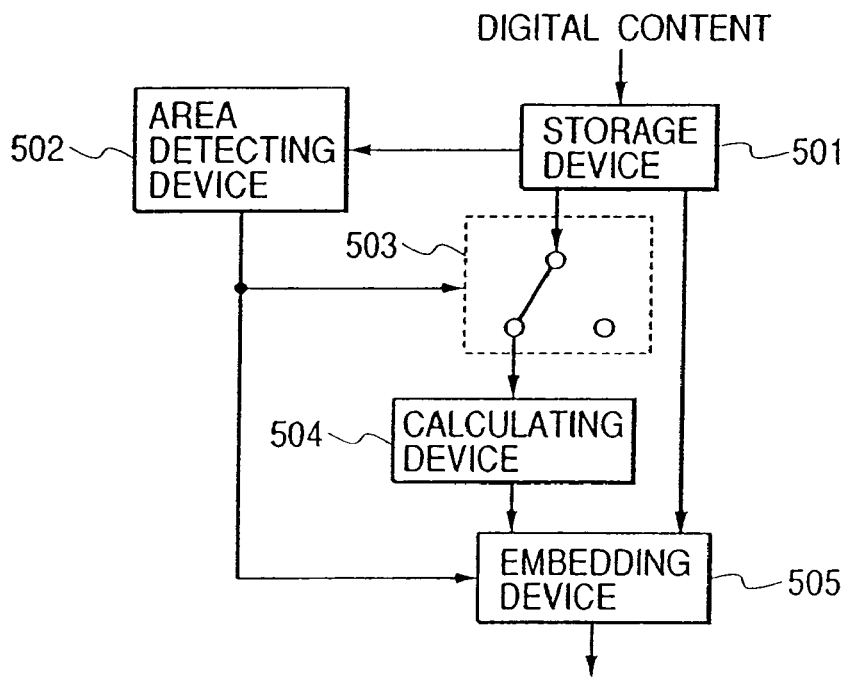
FIG. 5 is a diagram showing a digital watermark embedding apparatus according to a second embodiment of the present invention.

FIG. 5 is a block diagram illustrating a digital watermarking device according to a second embodiment of the present invention.

The digital watermarking device comprises: a storage device 501; an area detecting device 502, which employs area detection means, such as binarization means, to extract a hash target sub-set and an embedding target sub-set from digital contents that are input; a switch 503, which extracts a data value that is included in the hash target sub-set detected by the area detecting device 502; a calculating device 504, which calculates a hash value using the extracted data value; and a digital watermark embedding device 505, which embeds the obtained hash value as a digital watermark in the digital contents.

The input data values are stored in the storage device 501, from which they are read by the area detecting device 502, which detects a target area using a binarization method, for example. To determine the target area, the area detecting device 502 may receive coordinate information. Then, the digital contents stored in the storage device 501 are transmitted to the switch 503, and a data value is extracted from the hash target sub-set that was detected by the area detecting device 502.

Thereafter, the extracted data value is transmitted to the calculating device 504, and a hash value obtained by the calculating device 504 is transmitted to the embedding device 505. Subsequently, under the control of the area detecting device 502, the embedding device 505 embeds the hash value as a digital watermark in the embedding target sub-set of the digital contents that are stored in the storage device 501.

Figure 6:
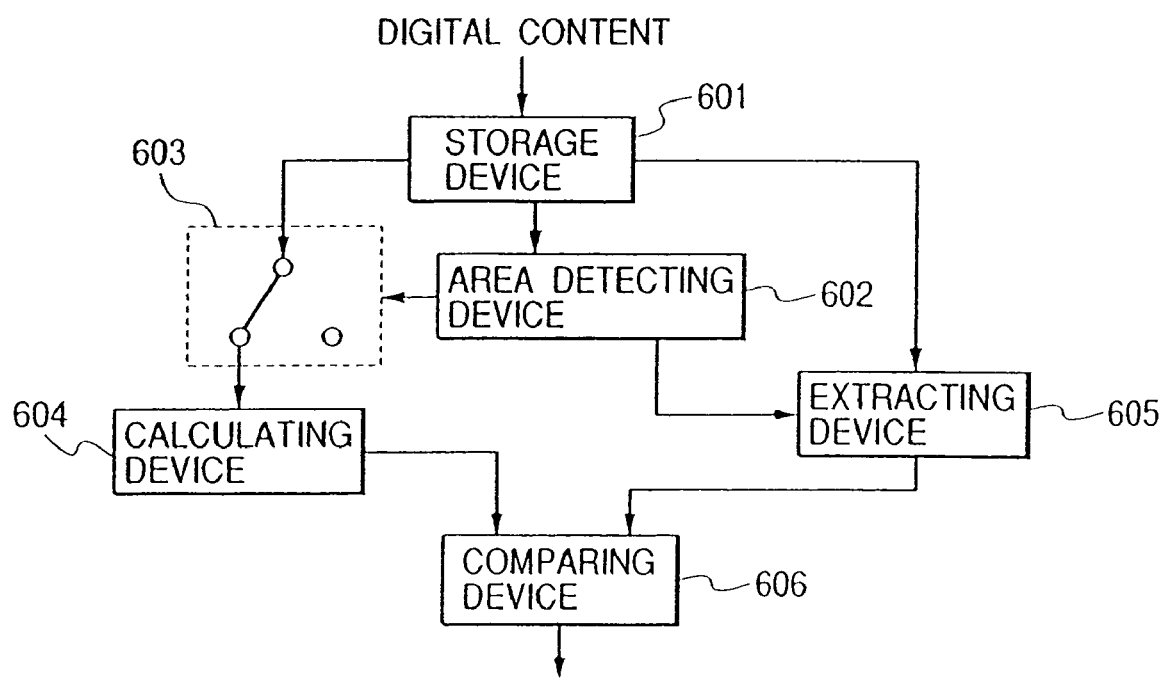
FIG. 6 is a diagram showing an illegality detecting device according to the second embodiment.

FIG. 6 is a block diagram illustrating an illegality detecting device according to the second embodiment.

The data that are input to the illegality detecting device are digital contents to be examined. The illegality detecting device comprises: a storage device 601; an area detecting device 602, which employs area detection means, such as binarization means, to extract a hash target sub-set and an embedding target sub-set from the digital contents that are input; a switch 603, which extracts a data value included in the hash target sub-set extracted by the area detecting device 602; a calculating device 604, which calculates a hash value from the extracted data value; a digital watermark extracting device 605, which extracts the hash value as the digital watermark from the embedding target sub-set of the digital contents; and a comparing device 606, which compares the hash value obtained by the calculating device 604 with the hash value extracted by the extracting device 605.

The digital contents that are input to the illegality detecting device are stored in the storage device 601, from which they are read by the area detecting device 602 that employs binarization means, for example, to extract the hash target sub-set and the embedding target sub-set, which are the same as those used for the area detecting device 502 in FIG. 5. To determine a target sub-set, the area detecting device 602 may receive coordinate information. Then, the data values for the digital contents stored in the storage device 601 are transmitted to the switch 603 with the output of the area detecting device 602, and a data value is extracted from the hash target sub-set.

The extracted data value is transmitted to the calculating device 604, and a hash value is calculated. Thereafter, under the control of the area detecting device 602, the digital contents stored in the storage device 601 are transmitted to the extracting device 604 for the extraction of embedded information as a digital watermark, and an embedded hash value is extracted from the digital contents. Subsequently, the comparing device 606 compares the hash value obtained by the calculating device 604 with the hash value extracted by the extracting device 605. When the two hash values match, the result output by the comparing device 606 indicates that the digital contents are legal. But when the two hash values do not match, the result output by the comparing device 606 indicates that the digital contents are illegal.

(Third Embodiment)

Figure 7:
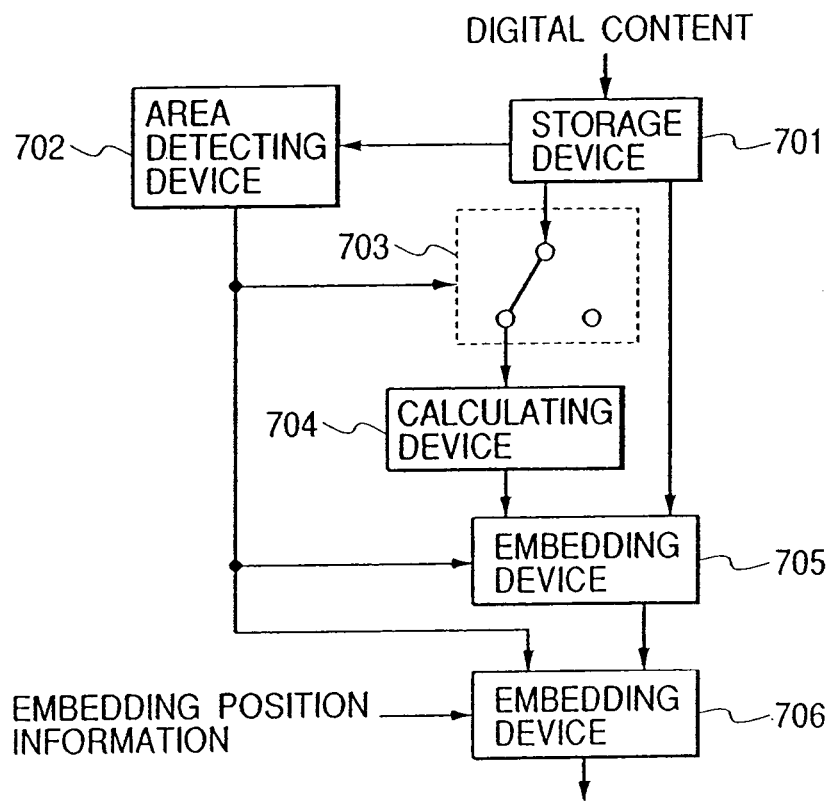
FIG. 7 is a diagram showing a digital watermark embedding device according to a third embodiment of the present invention.

FIG. 7 is a block diagram illustrating a digital watermarking device according to a third embodiment of the present invention.

The digital watermarking device comprises: a storage device 701; an area detecting device 702, which employs area detection means, such as binarization means, to extract a hash target sub-set and an embedding target sub-set from digital contents that are input; a switch 703, which extracts a data value that is included in the hash target sub-set detected by the area detecting device 702 in the digital contents that are input; a calculating device 704, which calculates a hash value using the extracted data value; a digital watermark embedding device 705, which embeds the obtained hash value as a digital watermark in the digital contents; and an embedding device 706, which embeds, at a predetermined position in the digital contents, positional information for the area that is detected by the area detecting device 702.

The data values that are input are stored in the storage device 701, from which they are read by the area detecting device 70 that employs a binarization method, for example, to detect a target area at a position that does not overlap the predetermined position indicated by the embedding positional information. To determine a target area, the area detecting device 702 may receive coordinate information. Then, the digital contents stored in the storage device 701 are transmitted to the switch 703, and a data value is extracted from the hash target sub-set that was detected by the area detecting device 702.

The extracted data value is thereafter transmitted to the calculating device 704, and under the control of the area detecting device 702, a hash value obtained by the calculating device 704 is transmitted to the embedding device 705. Subsequently, the embedding device 705 embeds the hash value as a digital watermark in the embedding target sub-set of the digital contents that are stored in the storage device 701, and the digital contents in which the digital watermark is embedded are transmitted to the embedding device 706. Together with the positional information, such as a coordinate value, for specifying the embedding target sub-set and the same positional information as those used for the hash target sub-set, the embedding device 706 embeds the digital contents at a predetermined position consonant with embedding positional information indicating a location that does not overlap the embedding target sub-set and the hash target sub-set.

Figure 8:
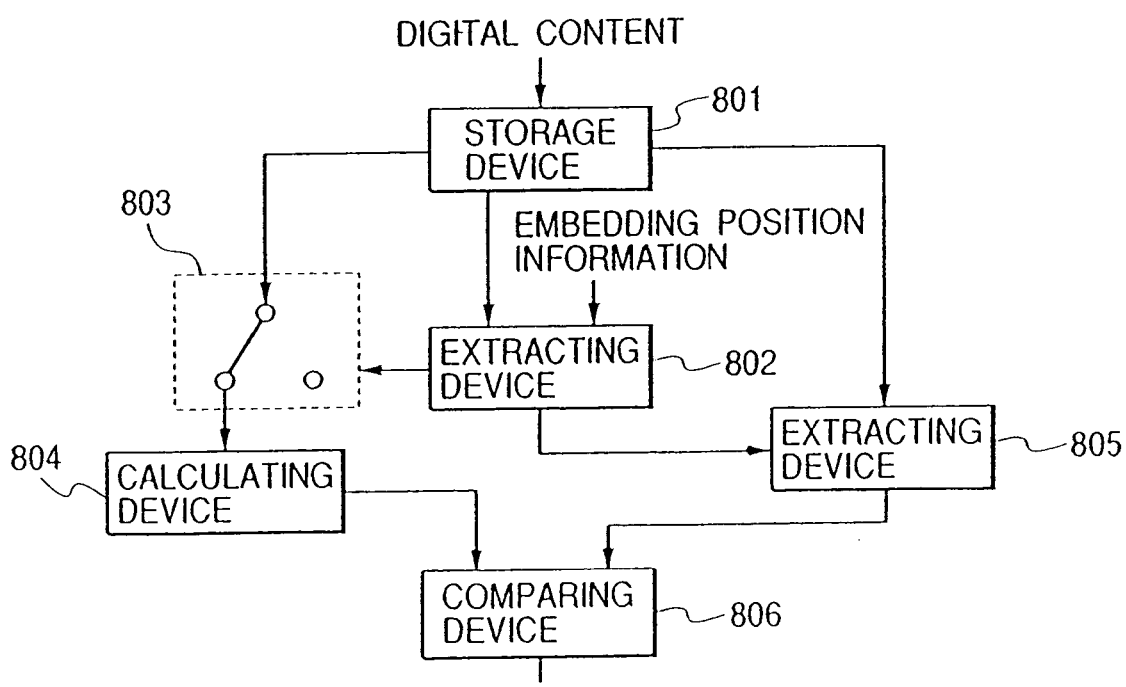
FIG. 8 is a diagram showing an illegality detecting device according to the third embodiment.

FIG. 8 is a block diagram illustrating an illegality detecting device according to the third embodiment.

The data that are input to the illegality detecting device are digital contents to be examined and embedding positional information. The illegality detecting device comprises: a storage device 801; a digital watermark extracting device 802, which extracts, from the input digital contents, positional information for a hash target sub-set that is embedded as a digital watermark and positional information for an embedding target sub-set; a switch 803, which extracts a data value included in the hash target sub-set extracted by the digital watermark extracting device 802; a calculating device 804, which calculates a hash value using the extracted data value; a digital watermark extracting device 805, which extracts the hash value as the digital watermark from the embedding target sub-set of the digital contents; and a comparing device 806, which compares the hash value obtained by the calculating device 804 with the hash value extracted by the extracting device 805.

The digital contents that are input to the illegality detecting device are stored in the storage device 801, from which they are read by the extracting device 802 that specifies a hash target sub-set and an embedding target sub-set using the positional information that is embedded as a digital watermark at a predetermined location. The data values of the digital contents stored in the storage device 801 are transmitted to the switch 803, which is controlled by the extracting device 802, and a data value is extracted from the hash target sub-set.

The extracted data value is transmitted to the calculating device 804, and a hash value is calculated. Thereafter, the digital contents stored in the storage device 801 are transmitted to the extracting device 804, which is controlled by the extracting device 802, and a hash value embedded as a digital watermark is extracted from the embedding target sub-set. The comparing device 806 then compares the hash value obtained by the calculating device 804 with the hash value extracted by the extracting device 805. When the two hash values match, the result output by the comparing device 806 indicates that the digital contents are legal. But when the two hash values do not match, the result output by the comparing device 806 indicates that the digital contents are illegal.

As is described above, according to the present invention, since a hash value obtained from a sub-set of digital contents is embedded as a digital watermark, an illegal activity, such as the addition of noise to a digital watermark, an intentional alteration or an image conversion, can be detected. In addition, since when such an illegal activity is detected the digital, contents are changed and are placed in a state that is inappropriate for use, the copyright can be protected.

(Fourth Embodiment)

Figure 9:
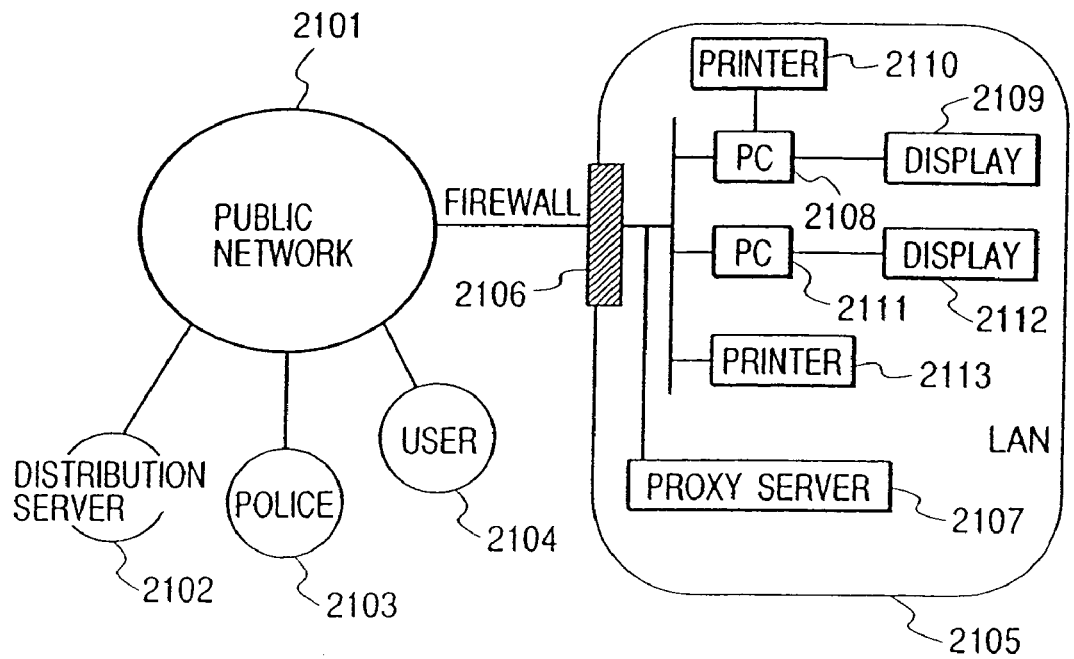
FIG. 9 is a diagram showing the arrangement of another system that comprises a general public network and peripheral devices.

FIG. 9 is a diagram illustrating the configuration of a general network, and an example environment for the employment of the present invention. The Internet is used as a typical example for a public network 2101.

A distribution server 2102, which distributes and sells various digital contents, such as digital images, police organizations 2103, users 2104 and local area networks (LANs) 2105, is connected to the public network 2101.

The distribution server 2102 is generally constituted by a World Wide Web server (Web server). The LAN 2105 is shielded from external access by a fire wall 2106, and only communications having predetermined parameters, such as signals originating at specific transmitters or certain types of transmission data, are permitted to pass between the LAN 105 and the public network 101.

A proxy server 2107, a personal computer (PC) 2108, a display device 2109 connected to the PC 2108, a printer 2110, another PC 2111, a display device 2112 connected to another PC 2111, and a printer 2113 connected directly to the LAN 2105 are included in the LAN 2105. The proxy server 2107 exercises control when the PCs 2108 and 2111 in the LAN 2105 access a Web server, such as the distribution server 2102, and all the data exchanged by the PC 2108 or 2111 and the server 2102 pass through the proxy server 2107.

Figure 10:
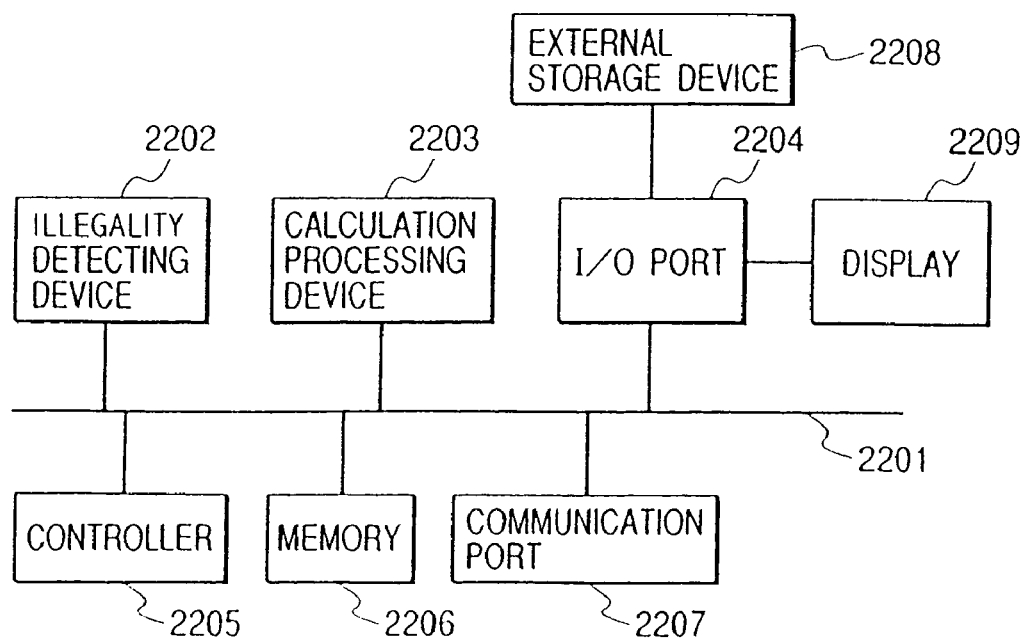
FIG. 10 is a diagram showing an example arrangement for a proxy server.

FIG. 10 is a diagram showing an example system for the proxy server 2107, which has a copyright protection function according to the fourth embodiment.

The system comprises a bus 2201, which is used for the exchange of data by the devices of the system; an illegality detecting device 2202; a calculation processing device 2203, which is operated in accordance with the detection results obtained by the illegality detecting device 2202; an I/O port 2204; a controller 2205 for controlling the individual devices; a memory 2206, in which digital contents input to the system are stored temporarily; a communication port 2207, which is connected to an external network, such as the LAN 2105; an external storage device 2208, which is connected to the I/O port 2204; and a display device 2209.

The illegality detecting device 2202 detects digital watermark information that is embedded in advance in digital contents by a digital watermark embedding device, and identifies illegal procedures that have been employed when processing the digital contents. When the digital watermark embedding device is mounted in an image input device, such as a digital camera or a scanner, the illegality detecting device 2202 can detect the performance of an illegal act that involves digital contents obtained by the image input device.

When digital contents are prepared by a computer, or application software, in which the digital watermark embedding device is mounted, the illegality detecting device 2202 can detect the performance of an illegal act for the digital contents. For this purpose, the digital watermark embedding device may be mounted on a storage device, a distribution server or a network device.

In the system for this embodiment, digital contents to be examined are transmitted across the LAN 2105, and/or the Lan 2105 and the public network 2101, and read at the communication port 2207, and are stored temporarily in the memory 2206. The digital contents in the memory 2206 are then transmitted to the illegality detecting device 2202 to determine whether they are legal. If the illegality detecting device 2202 determines that the digital contents are legal, the digital contents are then distributed via the communication port 2207 to the an entity that requested the distribution of the pertinent digital contents.

When the illegality detecting device 2202 determines that an illegal procedure has been performed for the digital contents, the calculation processing device 2203 performs one or more of the following processes:

(1) The calculation processing device 2203 performs, for digital contents, a visible/invisible digital watermark embedding process, such as filtering, encryption, scrambling or the addition of noise. Then, the resultant digital contents are output via the communicating port 2207 to the entity that requested the distribution of the digital contents.

(2) The calculation processing device 2203 writes information concerning a source for digital contents, information concerning an entity that has read the digital contents, and/or information concerning the digital contents, such as the name of the digital contents, via the external storage device 2208 connected to the I/O port 2204, and/or via the communication port 2207, to the databases in the distribution server 2102 and the police organization 2103.

(3) The controller 2205 halts the output.

(4) The calculation processing device 2203 issues an alarm message, and displays it on the display device 2209 connected to the I/O port 2204. A system that issues, via the communication port 2207, a warning across a network to the source of digital contents, or to a third party, can easily be constructed.

An explanation will now be given for a case wherein the illegality detecting device 2202 and the digital watermarking device are constituted by hardware.

It should be noted that the illegality detecting device and the digital watermarking device can also be easily implemented by a computer system configuration that uses another software application.

Figure 11:
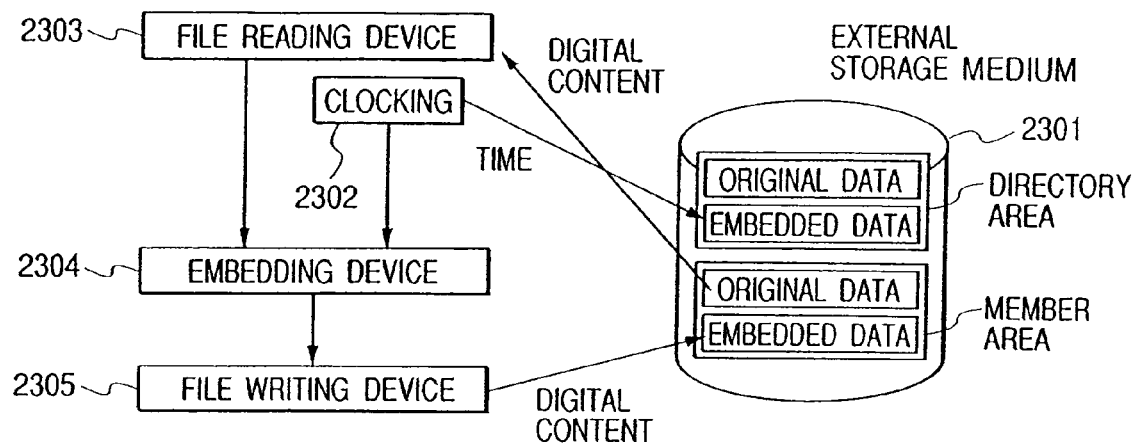
FIG. 11 is a diagram showing a digital watermark embedding device according to a fourth embodiment of the present invention.

FIG. 11 is a block diagram illustrating a digital watermarking device according to the fourth embodiment of the present invention.

The digital watermarking device comprises an external storage medium 2301, such as a magnetic storage medium, on which digital contents are stored; a clocking device 2302; a file reading device 2303; an embedding device 2304; and a file writing device 2305.

Figure 12:
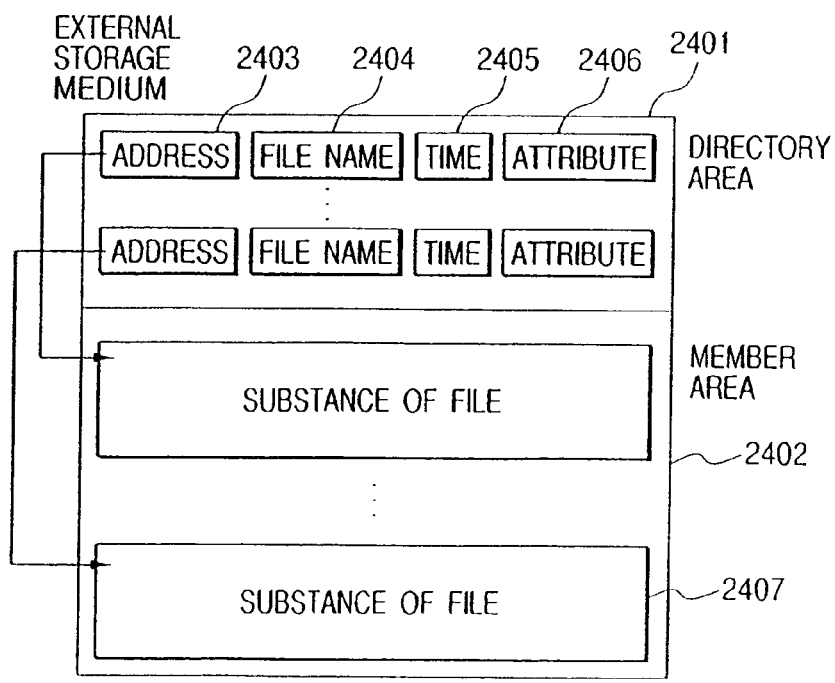
FIG. 12 is a conceptual diagram showing the configuration of a file for an external storage medium.

A specific file structure stored on the external storage medium 2301 is shown in FIG. 12.

A file on the external storage medium 2301 includes a directory area 2401 and a member area 2402. A name 2404 of a stored file; a storage start address 2403, for the substance of a file in the member area 2402; a file update time 2405, the time at which a file was updated each time it was edited; and a file attribute 2406, such as a read only file or a readable and writable file, are stored in the directory area 2401. A file substance 2407 is stored in the member area 2402.

The operation will now be described. The embedding device 2304 embeds a digital watermark using a conventional method, such as is described above. Since key information for the determination of an embedding location is required to embed a digital watermark, the embedding device 2304 embeds a digital watermark by using as key information an internally stored inherent value.

While a method requiring key information for the embedding and the extraction of a digital watermark is employed as the digital watermark embedding method, this is merely an example, and another digital watermark embedding method can be employed.

In the same manner, although an internally stored inherent value is employed as the key information, another value, such as an externally input value, can be employed.

In this case, first, the original digital contents, which are stored in the member area 2402 of the external storage medium 2301, are read by the file reading device 2303 and are transmitted to the embedding device 2304. The embedding device 2304 then embeds, in the digital contents, time information received from the clocking device 2302, and the file writing device 2305 writes the resultant digital contents in the member area 2402 of the external storage medium 2301.

At the same time, the file update time stored in the directory area 2401 of the external storage medium 2301 is written. At this time, when the original digital contents that have been watermarked are overwritten, the file update time is changed.

Before embedding the time in the digital contents, the embedding device 2304 can encrypt the digital contents, or can add a digital signature thereto in order to improve the safety.

When the digital contents (file) for which watermarking is performed by the embedding device 2304 are edited, only the file update time, which is stored in the directory area 2401 of the external storage medium 2301 and which indicates the time at which the file was last changed, is changed, while the digital contents preparation time that has been embedded as a digital watermark is not changed. Therefore, the difference between the preparation time and the file update time is greater than a predetermined threshold value.

A digital signature will now be described. A digital signature indicates that the creator of a message or information acknowledges that he or she prepared the pertinent data. In most cases, the digital signature is implemented by an asymmetric cryptosystem, but it can be implemented by a symmetric cryptosystem if a reliable organization exists. A typical digital signature is an RSA signature or an El Gamal signature.

For the RSA signature, a message (or a hash value for message) is encrypted using the RSA secret key of a user, and the encrypted message is transmitted with a signature to a recipient. The recipient decrypts the signature using the RSA public key of the sender, and compares the received message (or the hash value of the message) with the signature. When the two match, the recipient ascertains that the message is from an authorized sender.

A hash value will now be explained.

A hash value is a short output h constituting a compressed value for a long input series x that is obtained by using a function f: x→h. The hash function is a unidirectional function, and one of its has a properties is that it is difficult to obtain different inputs x and x' that satisfy $f(x')=f(x)$. A typical hash function is an MD5 (Message Digest5) or an SHA (Secure Hash Algorithm). Hash functions are described in detail in "Guide to Cryptography Theory", Eiji Okamoto, Kyoritsu Publishing Co., Ltd.

Figure 13:
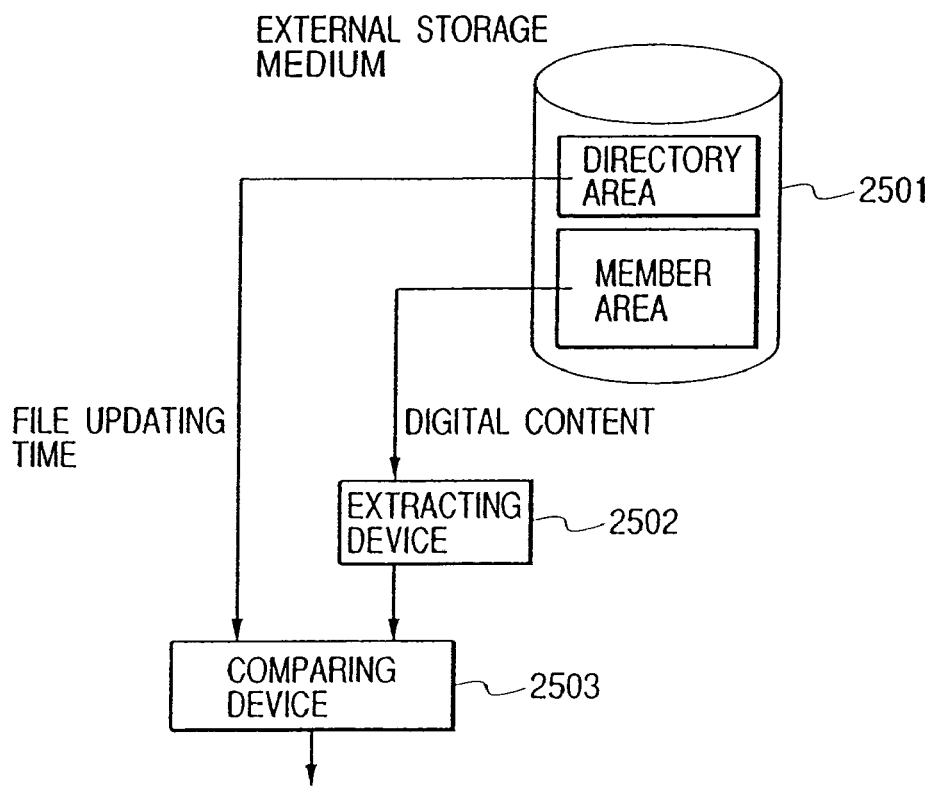
FIG. 13 is a diagram showing an illegality detecting device according to the fourth embodiment.

FIG. 13 is a block diagram illustrating an illegality detecting device according to a fourth embodiment.

The illegality detecting device comprises an external storage medium 2501, a digital watermark extracting device 2502, and a comparing device 2503.

The data input to the illegality detecting device are digital contents stored on the external storage medium 2501. The digital contents output by the illegality detecting device are those in which a digital watermark has been embedded by the digital watermark embedding device in FIG. 11, and for which an illegal activity, such as an alteration or an image conversion, has not been performed.

The digital watermark extracting device 2502 performs, for the digital contents, a frequency conversion that the embedding device 2304 performed during the embedding process. In addition, the same inherent value as that provided for the embedding device 2304 in FIG. 11 is stored in the digital watermark extracting device 2502.

The digital watermark extracting device 2502 employs the inherent value to extract embedded information from the digital contents for which a frequency conversion has been performed. The extraction method is explained in detail in the references described above for the background art. When a method whereby a frequency conversion is not performed is employed by the embedding device 2304 to embed a digital watermark, the digital watermark extracting device 2502 also does not perform a frequency conversion, and extracts information using the digital contents and the inherent value. Further, similarly to the digital watermark embedding device 2304, another extraction method can be employed, and an inherent value may be input externally.

The digital contents input to the illegality detecting device are transmitted to the digital watermark extracting device 2502, and the time that was embedded as a digital watermark is read and transmitted to the comparing device 2503. The comparing device 2503 also receives the file update time that is stored on the external storage medium 2501. Then, the comparing device 2503 compares the two received times. When the difference between the two times is greater than a predetermined threshold value, it is ascertained that an illegal act was performed for the digital contents.

(Fifth Embodiment)

An explanation will now be given for a digital watermark embedding device and an illegality detecting device according to a fifth embodiment of the present invention.

Since for this embodiment digital watermark endurance is employed, endurance will be explained first.

Digital watermark endurance is the degree to which information embedded as a digital watermark can be correctly extracted from digital contents that have undergone a compression or a filtering process.

If, for a digital watermark, endurance is high, embedded information will remain even after one of the above processes has been performed. But if the method used for embedding produced a digital watermark for which endurance is low, it is very probable that by subjecting the digital contents to only the smallest amount of processing the embedded information will be destroyed.

Figure 14:
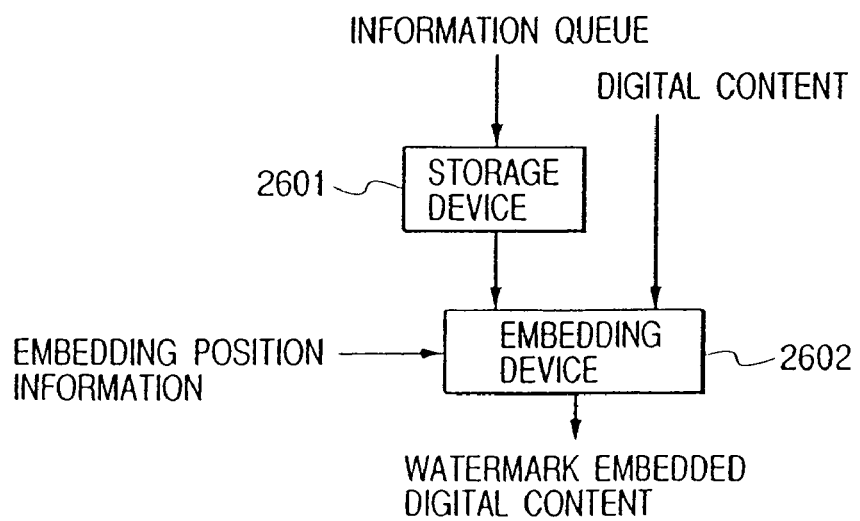
FIG. 14 is a diagram showing a digital watermark embedding device according to a fifth embodiment of the present invention.

FIG. 14 is a block diagram illustrating a digital watermarking device according to the fifth embodiment of the present invention.

The digital watermarking device comprises a storage device 2601 and an embedding device 2602. If the embedding device 2602 employs an embedding method whereby endurance is so low that a digital watermark is destroyed, an illegality detecting device can be provided that can detect even a slight alteration of digital contents to which a watermark has been added.

The data input to the digital watermarking device are digital contents, a data string to be embedded as a digital watermark, and positional information, such as a coordinate value, that are required in order to embed a data string as a digital watermark in the digital contents. It should be noted that the data string is obtained by encoding information inherent to the digital contents, information concerning an entity that embeds a digital watermark, copyright information, or information concerning the user who obtains the digital contents.

The input data string is stored temporarily in the storage device 2601, and is transmitted with the embedding positional information to the embedding device 2602 and repetitively embedded throughout all of the digital contents at positions that do not overlap each other.

Figure 15:
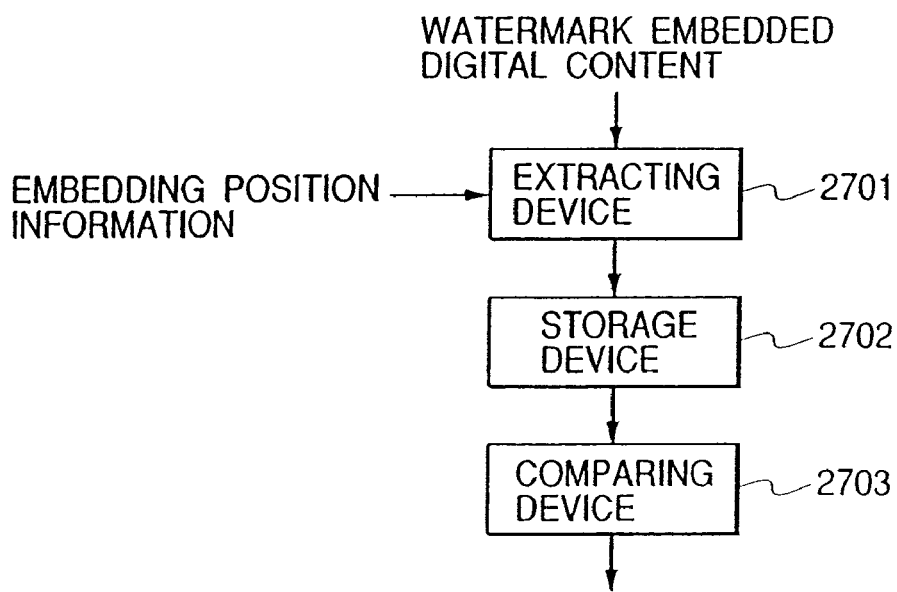
FIG. 15 is a diagram showing an illegality detecting device according to the fifth embodiment.

FIG. 15 is a block diagram illustrating an illegality detecting device according to a fifth embodiment.

The illegality detecting device comprises a digital watermark extracting device 2701, a storage device 2701 for storing extracted information, and a comparing device 2703. Data input to the illegality detecting device are digital contents that are to be examined and embedding positional information that is represented by a coordinate value specifying a watermark embedding location.

The digital contents output by the illegality detecting device are those for which a digital watermark has been embedded by the embedding device in FIG. 14 and for which an illegal activity, such as an alteration, has not been performed thereafter.

When the digital contents and the embedding positional information are input to the illegality detecting device, the digital watermark extracting device 2701 extracts all the data that are repetitively embedded throughout all of the digital contents. These data are then stored separately in the storage device 2702, and a comparison of them is performed by the comparing device 2703. When different data are found among them, the comparing device 2703 ascertains that an illegal act involving the digital contents has been performed.

Since the digital watermark has been embedded by a method that provides low endurance, if, for the digital contents, there has been an illegal act, such as an alteration, least one of the multiple embedded data sets will have been destroyed.

In this embodiment, the same data are embedded throughout all the digital contents. However, even when a digital watermark embedding device embeds different data in the digital contents, and the illegality detecting device examines the correlation of the data, an apparatus for determining the legality of the digital contents can be easily constructed.

Furthermore, when, in the digital watermarking device in FIG. 14, not only embedding position information but also a quantization step that corresponds to an embedding location is input to the embedding device 2602, a digital watermark can be embedded for which the endurance level differs, depending on the portion. Since the embedding positional information and the quantization step corresponding to the embedding location are input to the illegality detecting device, the embedded information can be extracted using the quantization step that corresponds to the embedding location, and the strength of the digital contents protection function can be partially changed.

(Sixth Embodiment)

An explanation will now be given for an embedding device that can be used as the embedding device 2602, and a corresponding extracting device according to a sixth embodiment of the present invention.

Figure 16:
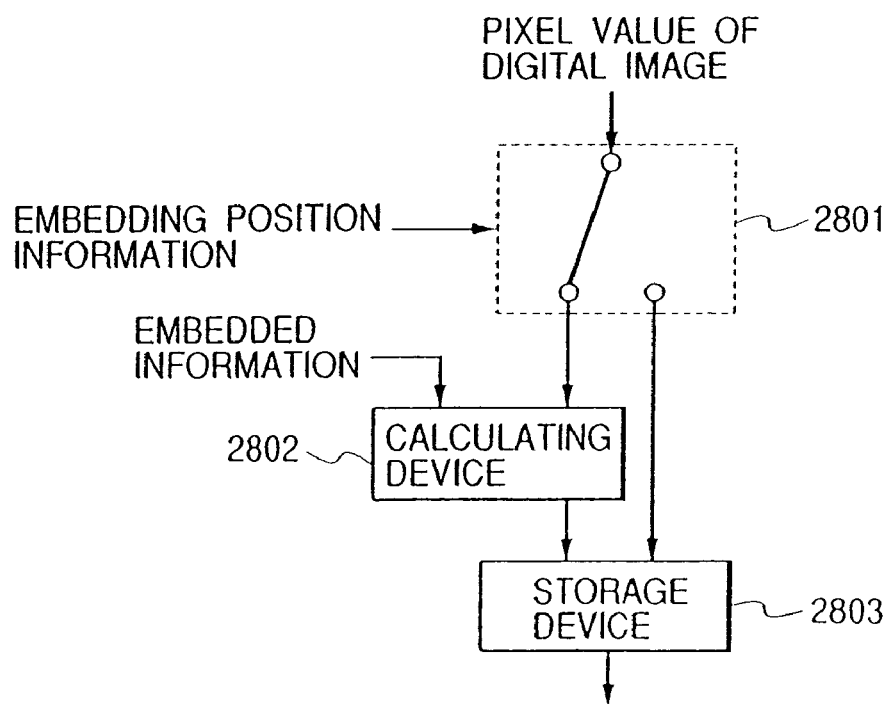
FIG. 16 is a diagram showing a digital watermark embedding device according to a sixth embodiment of the present invention.

FIG. 16 is a block diagram illustrating a digital watermarking device that embeds, in digital contents, a digital watermark having low endurance. Data input to the watermarking device are embedding positional information, data values constituting digital contents, and binary information to be embedded. The watermarking device outputs data values for the digital contents that are watermarked.

The digital watermarking device comprises a switch 2801, which separates the received data values into data values that are embedding targets and data values that are not targets, a calculating device 2802, and a storage device 2803.

At the switch 2801, which is controlled in accordance with the embedding positional information, the data values for the input digital contents are separated into data values that are embedding targets and data values that are not targets. A data value that is an embedding target is transmitted to the calculating device 2802, which then embeds information in the following manner.

First, the absolute value of a data value is divided by a predetermined value. The predetermined value is called the strength, and the quotient is called a quantization step. As the strength is increased, the endurance provided for a digital watermark becomes higher. Then, each data value is changed to match the product of the quantization step and a specified integer. The integer used here is called an index. If the embedded information has a value of 1, an odd number (even number) is employed as the index. If the embedded information has a value of 0, an even number (odd number) is employed as the index. Time matching is acquired between the data value in which the information is embedded and a data value that is not an embedding target, and both data values are output.

Figure 17:
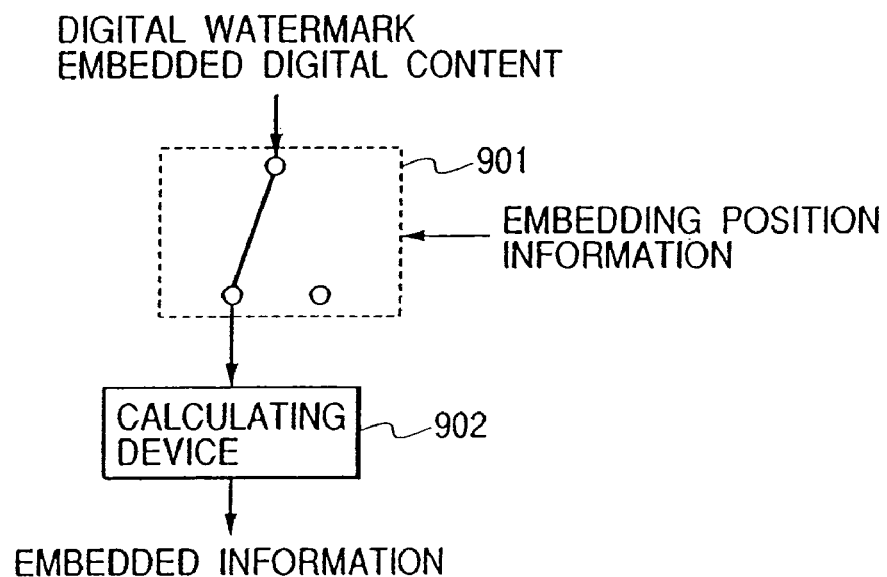
FIG. 17 is a diagram showing an illegality detecting device according to the sixth embodiment.

FIG. 17 is a block diagram showing an extracting device that extracts a digital watermark that is embedded using the above method.

Data input to the extracting device are digital contents in which a watermark has been embedded, and embedding positional information. The extracting device outputs embedded information that is extracted from the digital contents.

At a switch 2901, which is controlled in accordance with the embedding positional information, the input digital contents are separated into data values in which a digital watermark is embedded and data values in which no digital watermark is embedded. The data values in which the watermark is embedded are transmitted to a calculating device 2902. The calculating device 2902, which includes the same quantization step as does the calculating device 2802, extracts embedded information by examining the indexes of the individual data values, and outputs the extracted information.

(Seventh Embodiment)

An explanation will now be given for the hardware arrangement of a copyright protecting device that is constituted by an illegality detecting device. The copyright protecting device can not only be easily implemented using hardware, but can also be implemented using software.

Figure 18:
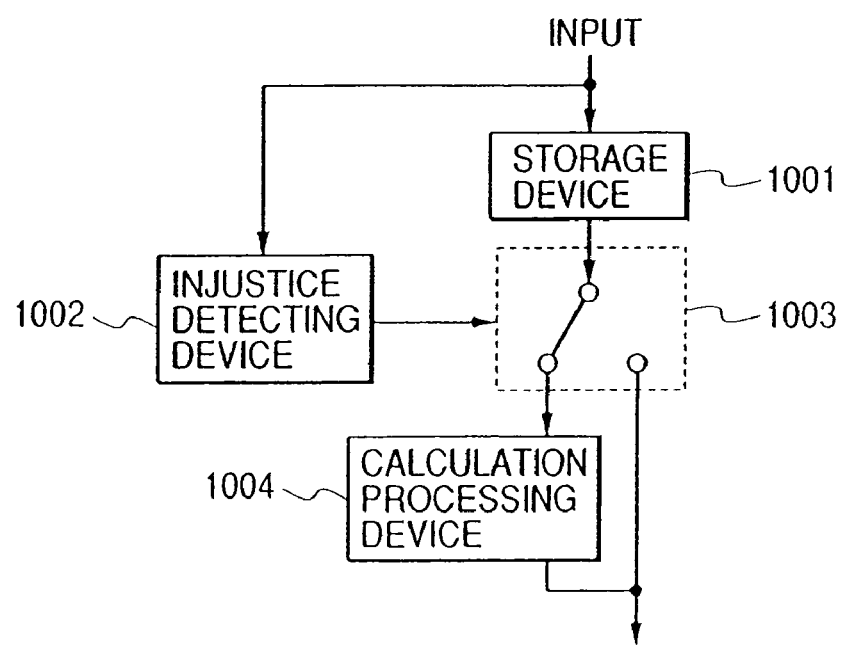
FIG. 18 is a diagram showing a copyright protecting device according to a seventh embodiment of the present invention.

FIG. 18 is a block diagram illustrating a device, constituted by an illegality detecting device, for protecting a copyright for digital contents according to a seventh embodiment.

When the copyright protecting device is mounted on a display device, for a legal image, an original image will be displayed on the screen of the display device, but for an illegal image, only a filtered image will be displayed. Further, if the copyright detecting device is mounted in a printer, for a legal image, the original image will be printed by the printer, but for an illegal image, only a filtered image will be printed.

Therefore, even if an illegal image is obtained, it is difficult to actually employ it, and the copyright can be protected. The copyright protecting device can be mounted not only in a printer and on a display device, but also in another network apparatus, a peripheral device or a computer.

The copyright protecting device comprises: a storage device 1001; an illegality detecting device 1002 according to one of the above embodiments; a switch 1003, which is controlled in accordance with the output of the illegality detecting device 1002 and which is used to determine whether the digital contents are to be output after being deformed, or are to be output unchanged; and a calculating device 1004.

The digital contents input to the copyright protecting device are examined by the illegality detecting device 1002 to determine whether they were illegally obtained, and are also stored in the storage device 1001, from which they are transmitted to the switch 1003. When the illegality detecting device 1002 determines that the digital contents are legal, the digital contents are output unchanged by the copyright protecting device. But when the illegality detecting device 1002 determines that the digital contents are illegal, the digital contents are transmitted to the calculating device 1004.

The calculating device 1004 filters the digital contents. For illegal digital contents, the filtered contents are output by the copyright protecting device. In this embodiment, filtering is performed by the calculating device 1004; however, it is apparent that another process, such as scrambling, can be employed.

(Eighth Embodiment)

Figure 19:
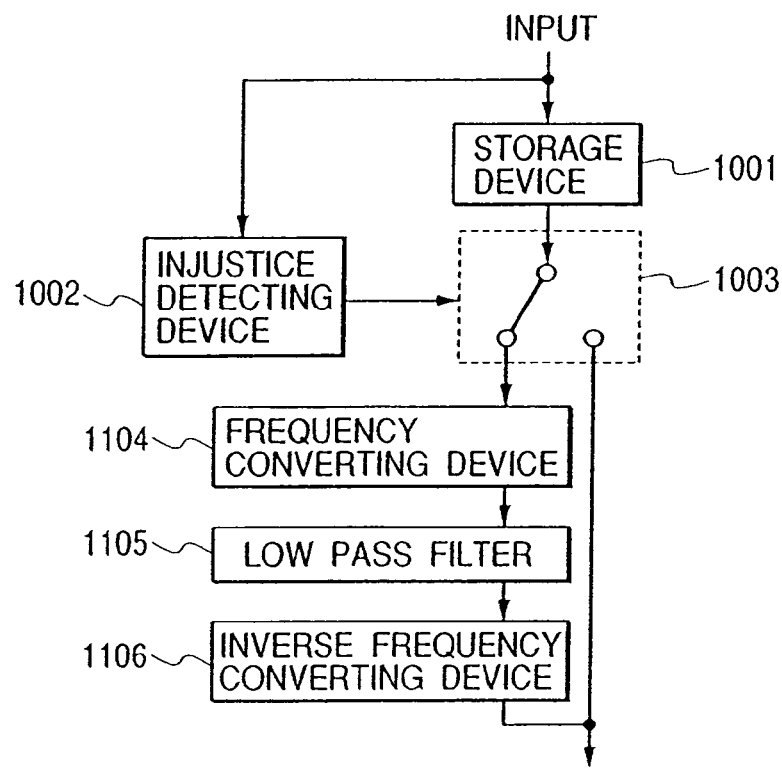
FIG. 19 is a diagram showing a copyright protecting device according to an eighth embodiment of the present invention.

FIG. 19 is a diagram showing a copyright protecting device according to an eighth embodiment.

In the copyright protecting device, the calculating device 1004 in FIG. 18 is replaced by a frequency converting device 1104, a low pass filter 1105 and an inverse frequency converting device 1106, which is especially intended for an input digital image. Then, when an illegal activity is detected, the digital image is output at a lower resolution.

When the copyright protecting device is mounted on a display device, a legally obtained image is displayed at a high resolution, while an illegally obtained image is displayed at only a low resolution. When the copyright protecting device is mounted on a printer, a legally obtained image can be printed at a high resolution, while an illegally obtained image is printed at a low resolution.

In FIG. 19, when an illegality detecting device 1002 determines that an input digital image is illegal, the digital image stored in a storage device 1001 is converted into a frequency domain by the frequency converting device 1104. Thereafter, a high band is cut by the low pass filter 1105 and the result is returned to a spatial domain by the inverse frequency converting device 1106. Since the digital image is compressed by this process, the copyright protection function can be provided.

(Ninth Embodiment)

Figure 20:
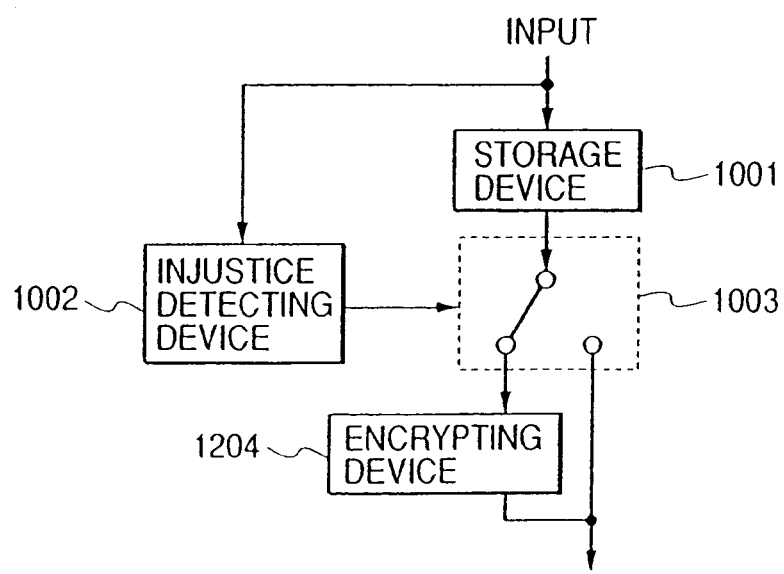
FIG. 20 is a diagram showing a copyright protecting device according to a ninth embodiment of the present invention.

FIG. 20 is a diagram showing a copyright protecting device according to a ninth embodiment, wherein the calculating device 1004 in FIG. 18 is replaced by an encrypting device 1204. When an illegality is detected, input digital contents are encrypted and the encrypted contents are output.

If the copyright protecting device is mounted on a hard disk, every user can download and save the digital contents through the distribution server in FIG. 9. However, since an illegal digital image is stored while being encrypted, the data can not be read unless the user has the correct decryption key. While taking into account that the device in this embodiment is employed to protect a copyright, it is appropriate that a decryption key be held by a third, fair party, such as the police.

In FIG. 20, an illegality detecting device 1002 determines that the digital contents that have been input are illegal, the encrypting device 1204 encrypts the digital contents stored in a storage device 1001, and outputs the encrypted contents.

In this manner, the copyright protection function can be implemented. The encryption system used here is the common key encryption system, such as DES, or the public key encryption system, such as RSA (for a detailed discussion of these encryption systems, refer to "Guide to Cryptography Theory", Eiji Okamoto, Kyoritsu Publishing Co., Ltd.).

(Tenth Embodiment)

Figure 21:
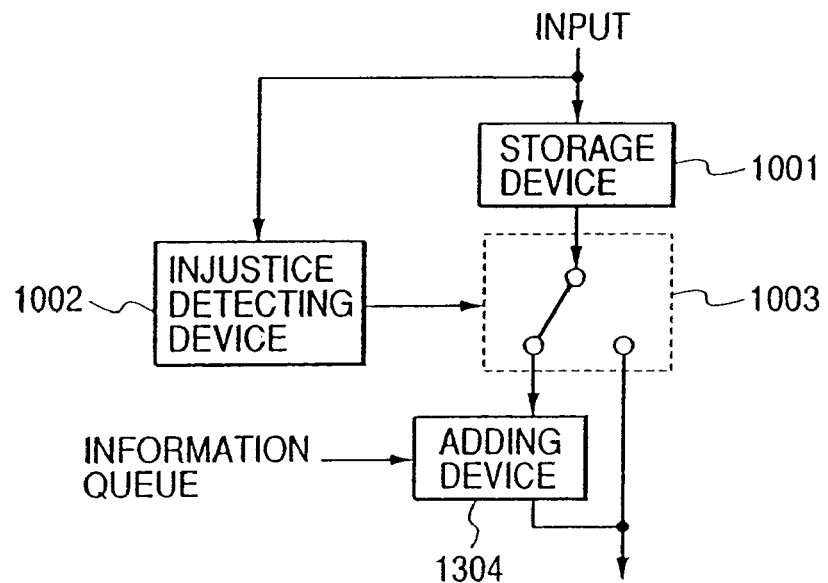
FIG. 21 is a diagram showing a copyright protecting device according to a tenth embodiment of the present invention.

FIG. 21 is a diagram showing a copyright protecting device according to a tenth embodiment of the present invention, for which the calculating device 1004 is replaced by an adding device 1304. With this arrangement, when an illegality is detected in digital contents that are input, the digital contents are output with noise added.

An effective arrangement is for the copyright protecting device to be mounted on an output device, such as a display device or a printer. When altered digital contents are input, the output device on which the copyright detecting device is mounted outputs digital contents to which noise has been added. It is apparent that the copyright protecting device can also be mounted on a device other than a display device and a printer.

In FIG. 21, when, for digital contents, an illegality detecting device 1002 determines that an illegal act has been performed, the digital contents, which are stored in a storage device 1001, are transmitted with a bit string to the adding device 1304. The adding device 1304 adds the digital contents and the bit string and outputs the result. Therefore, since noise has been added to the digital contents they are degraded and are not appropriate for use. The bit string that is added is constituted by random noise, regular noise, or meaningful information. In this manner, the copyright protecting function can be implemented.

(Eleventh Embodiment)

Figure 22:
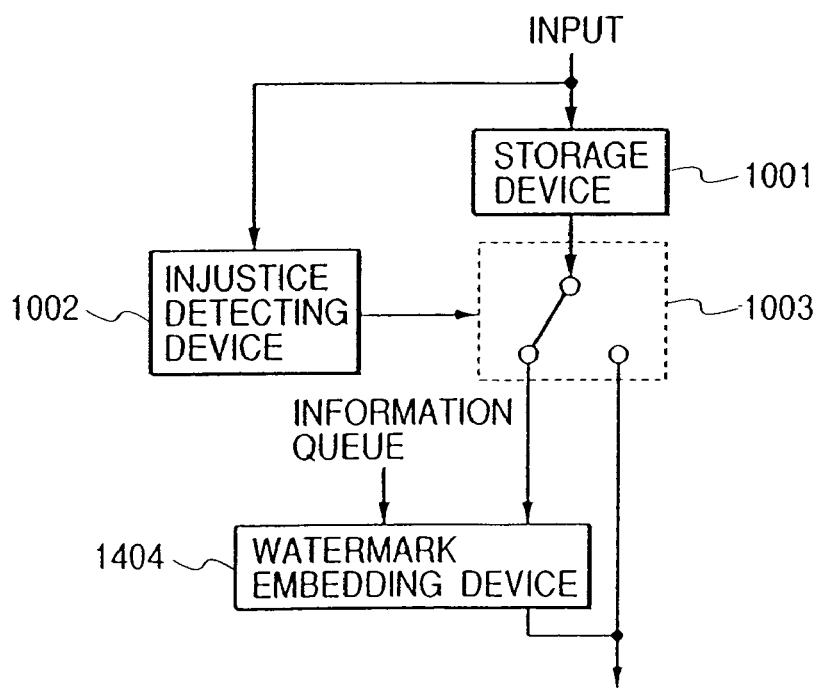
FIG. 22 is a diagram showing a copyright protecting device according to an eleventh embodiment of the present invention.

FIG. 22 is a diagram showing a copyright protecting device according to an eleventh embodiment of the present invention. Since the calculating device 1004 is replaced by a watermark embedding device 1404, illegal digital contents are output after a digital watermark is embedded therein.

When the watermark embedding device 1404 is so designed that it can embed a visible digital watermark in digital contents, and when the copyright protecting device is mounted on a printer or a display device, an image wherein a character or a mark is added to the digital contents is output upon the detection of an illegal activity.

Further, when the watermark embedding device 1404 is so designed it can embed an invisible digital watermark in digital contents and when the copyright protecting device is mounted on an external storage device, information concerning a transmission destination for the digital contents and information for a source are embedded as a digital watermark. So long as an illegal image is not encountered, this information is not embedded in the digital contents and privacy is protected. Further, since the above information is embedded only when an illegal image is encountered, although an inspection can be performed by the police is possible privacy is still protected.

It is noted that the copyright protecting device can be mounted on a device other than a printer, a display device or an external storage device.

In FIG. 22, when it is ascertained that the input digital contents are illegal, the digital contents stored in a storage device 1001 are transmitted with the embedding information to the watermark embedding device 1404 by the illegality detecting device 1002. Thereafter, the watermark embedding device 1404 embeds a digital watermark in the digital contents. In this manner, the copyright protection function can be carried out.

(Twelfth Embodiment)

Figure 23:
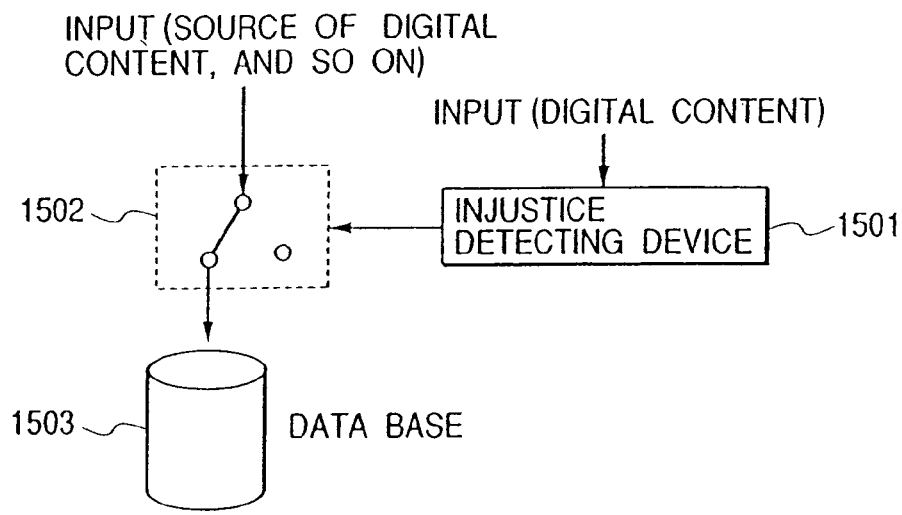
FIG. 23 is a diagram showing a copyright protecting device according to a twelfth embodiment of the present invention.

FIG. 23 is a diagram showing a copyright protecting device according to a twelfth embodiment of the present invention.

The copyright protecting device comprises: an illegality detecting device 1501, a switch 1502, which is controlled in accordance with the output of the illegality detecting device 1501; and a database 1503, in which is stored user information for a user who, for digital contents, performed an illegal act.

Data input to the copyright protecting device are digital contents to be examined, and user information for an information source for digital contents.

When digital contents are input to the copyright protecting device, the illegality detecting device 1501 determines whether the digital contents are illegal. The results of the illegality detecting device 1501 are then transmitted to the switch 1502. When the digital contents are illegal, information concerning the source of the digital contents is transmitted via the switch 1502 to the database 1503 and stored therein. When the digital contents are legal, the source information is not stored.

The database 1503 is a part of the distribution server and of the police, and it is appropriate to write data across the network to the database 1503. The data written to the database 1503 are used by the police, for example, for the investigation of crimes.

Useful data that are to be written to the database 1503 are sender information, recipient information, and the name of digital contents.

(Thirteenth Embodiment)

Figure 24:
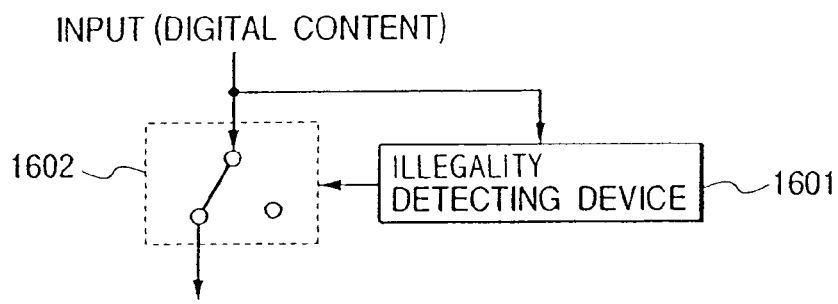
FIG. 24 is a diagram showing a copyright protecting device according to a thirteenth embodiment of the present invention.

FIG. 24 is a block diagram showing a copyright protecting device according to a thirteenth embodiment of the present invention.

The copyright protecting device outputs the digital contents when they are determined to be legal, and does not output any data in the other case. That is, when the copyright protecting device is mounted on a printer, when an attempt is made to print an illegal image, nothing is printed. Furthermore, when the copyright protecting device is mounted on a display device, an illegal image is not displayed, and when the copyright protecting device is mounted on a storage device, illegal digital data are not stored.

The copyright protecting device in this embodiment comprises an illegality detecting device 1601 and a switch 1602 that is controlled by the illegality detecting device 1601. The digital contents input to the copyright protecting device are transmitted to the illegality detecting device 1601 and the switch 1602. Only when the illegality detecting device 1601 determines that the digital contents are legal is the switch 1602 changed to the output side and the digital contents output.

In this embodiment, a device that does not output all the digital contents is employed. However, it is easy to construct a device that does not output a part of the digital contents, e.g., a color digital image output device that does not output the luminance or, brightness level of an image, or an arbitrary parameter, such as R, G or B.

(Fourteenth Embodiment)

Figure 25:
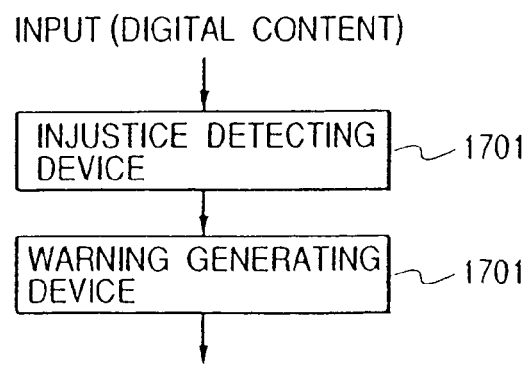
FIG. 25 is a diagram showing a copyright protecting device according to a fourteenth embodiment of the present invention.

FIG. 25 is a block diagram showing a copyright protecting device according to the fourteenth embodiment of the present invention.

The copyright protecting device in this embodiment outputs a warning when it is determined that digital contents are illegal. The copyright protecting device can be mounted on a PC, a display device or a printer and will issue a warning to a user who employs an image. It can also be mounted on the proxy server 2107, the fire wall 2106 or the distribution server 2101 in FIG. 9. When the copyright protecting device in this embodiment is mounted on one of the above devices, a warning can be issued across the network to a user who distributed the illegal contents or to an operator at the police or at the distribution server. The copyright protecting device comprises an illegality detecting device 1701 and a warning generating device 1702 that is controlled by the illegality detecting device 1701. The digital contents input to the copyright protecting device are transmitted to the illegality detecting device 1701 to determine whether they are illegal. If the digital contents are illegal, the warning generating device 1702 issues a warning to a destination. When the digital contents are legal, nothing action is taken.

When a plurality of the copyright protecting devices in the above embodiments are employed together, a copyright protecting device having multiple copyright protection functions can be provided.

Furthermore, when a plurality of the illegality detecting devices or watermarking devices in the above embodiments are employed together, various types of illegality detecting devices or watermarking devices can be provided.

As is described above, according to the present invention, even if, for the digital contents, an illegal act has been performed, a digital watermark with which the illegal activity can be easily detected later can be embedded in the digital contents.

In addition, according to the present invention, whether, for digital contents, an illegal act has been performed can be easily detected by extracting and employing a digital watermark that is embedded in the digital contents by the watermark embedding device.

Further, according to the present invention, when, for digital contents in which a watermark has been embedded, an illegal act has been performed, correct digital contents are prevented from being received by a user, and the protection of the copyright for the digital contents is ensured.

(Fifteenth Embodiment)

Figure 26:
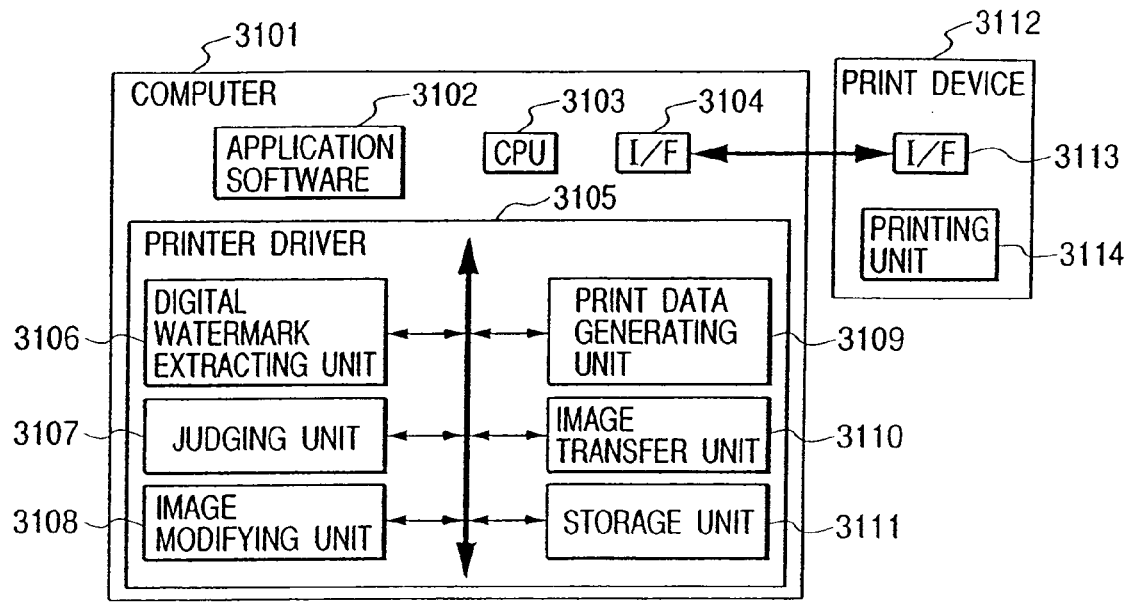
FIG. 26 is a diagram illustrating a printing system according to a fifteenth embodiment of the present invention.

FIG. 26 is a schematic diagram illustrating the arrangement of a printing system that is constituted by a printing controller (printer driver) that serves as a data output controller according to a fifteenth embodiment of the present invention. In this embodiment, a printing controller (printer driver) is employed as an example data output controller; however, the printing system can be easily mounted on another data output controller.

The printing system comprises a computer terminal 3101, and a print device 3112, which is connected to the computer terminal 3101.

The computer terminal 3101 includes: an application software program 3102, which has a function for processing an externally obtained image; a CPU 3103, which reads and executes individual programs; an interface (I/F) 3104, which transfers print data to the print device 3112; and a printer driver 3105, which converts image data generated by the application software 3112 into print commands for the print device 3112.

The printer driver 3105 includes: a digital watermark extracting unit 3106, which extracts a digital watermark from image data that are generated by the application software 3102; a judging unit 3107, which analyzes embedded information that is extracted from the image data by the watermark extracting unit 3106 and which controls an image modifying unit 3108 and/or a transmission source for the image data; and an image modifying unit 3108, which performs an image modifying process, including image data correction, such as color correction, an embedding/or canceling process for a visible digital watermark, encryption and/or decryption, and scrambling and/or the cancellation of scrambling.

The printer driver 3105 further comprises: a print data generating unit 3109, which analyzes image data generated by the application software 3102 or image data modified by the image modifying unit 3108, and generates print data that can be printed by the print device 3112 and temporarily stores the print data in a storage unit 3111; an image transfer unit 3110, which employs the I/F 3104 to transmit, to the print device 3112, the print data stored in the storage unit 3111; and the storage unit 3111, in which the print data generated by the print data generating unit 3109 and intermediate calculation results for the individual processes are stored temporarily, as needed.

The print device 3112 includes: an I/F 3113, which receives print data from the computer terminal 3101; and a printing unit 3114, which prints the print data received by the I/F 3113.

In accordance with embedding positional information that indicates the location whereat a digital watermark is embedded, the digital watermark extracting unit 3106 obtains information that is embedded as a watermark in image data that are received from a peripheral device, such as an input device or a storage device, connected to the computer terminal 3101, or in image data that are generated/edited by the application software 3102. The digital watermark extracting unit 3106 may extract embedded information, without receiving embedding positional information.

The print data generating unit 3109, in accordance with print control information, binarizes (another radix numeration system may be employed) and rasterizes image data that are generated by the application software 3102. The print control information includes: a paper size for image data; a print color, such as the automatic selection of color or monotone; a resolution for the processing of print data; a color conversion for print data; and a binarization method for print data, all of which are set by the application software 3102, or by a user on a display by employing an input device, such as a mouse or a keyboard.

Figure 27:
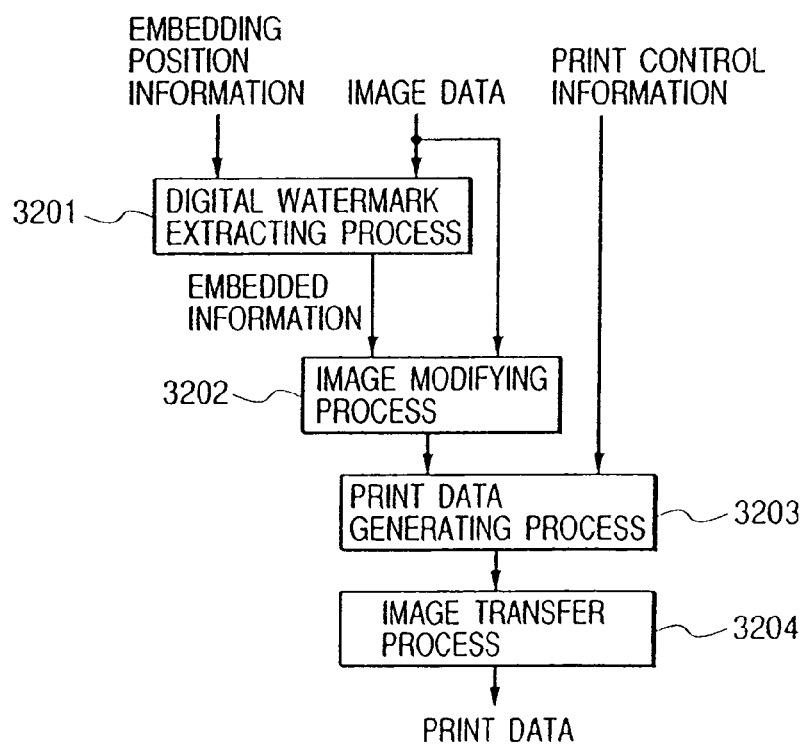
FIG. 27 is a diagram showing the process performed by a data output controller according to the fifteenth embodiment.

FIG. 27 is a block diagram showing the processing performed by the printer driver 3105 (print controller) according to the fifteenth embodiment of the present invention. This processing includes: a digital watermark extracting process 3201, performed by the digital watermark extracting unit 3106; an image modifying process 3202, performed by the image modifying unit 3108; a print data generating process 3203, performed by the print data generating unit 3109; and an image transfer process 3204, performed by the image transfer unit 3110.

In accordance with embedding positional information, the watermark extracting unit 3201 extracts embedded information, image density correction data, from image data that are generated by the application software 3102. Then, in the image modifying process 3202, the image data are added to the embedding information (density correction data) to modify an image.

In this embodiment, density correction is performed, as an example. However, another correction means, such as luminance correction or gamma correction, may be performed as part of the above processing. The image data modified during the image modifying process 3202 are transmitted, to the print data generating process 3203, with print control information, such as a paper size for printing image data, and print data are generated and printed by the printer. During the image transfer process 3204, the obtained print data are transmitted to the print device 3112 and printed.

(Sixteenth Embodiment)

Figure 28:
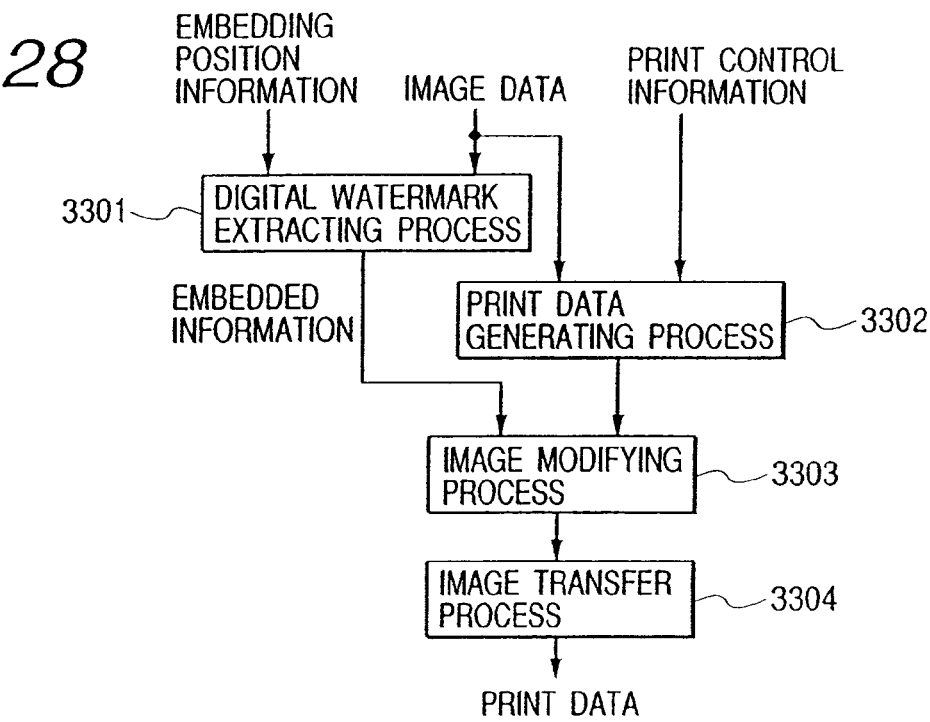
FIG. 28 is a diagram showing the process performed by a data output controller according to a sixteenth embodiment of the present invention.

FIG. 28 is a diagram showing the processing performed by a printer driver 3105 according to a sixteenth embodiment of the present invention. This processing includes: a digital watermark extracting process 3301, performed by the digital watermark extracting unit 3106; a print data generating process 3302, performed by a print data generating unit 3109; an image modifying process 3303, performed by an image modifying unit 3108; and an image transfer unit 3304, performed by an image transfer unit 3110. The individual processes 3301 to 3304 are the same as the processes 3201 to 3204 in FIG. 27.

The image data generated by application software 3102 are transmitted to the print data process 3302 with the print control information, such as a paper size for printing image data, and print data are generated. The obtained print data and the embedding information that are extracted in the watermark extracting process 3202 are transmitted to the image modifying process 3202. In the image modifying process 3202, the print data are modified in accordance with the embedding information. When embedding information is print mode information for the print device 3112, such as fast/high quality/standard, a setup command for the print mode is changed.

In this embodiment, the print mode change processing is performed as an example; however, changing to another print command, or another means, such as density correction, luminance correction or gamma correction, may be performed. During the image transfer process 3204, the modified print data are transmitted to the print device 3112 and printed.

(Seventeenth Embodiment)

Figure 29:
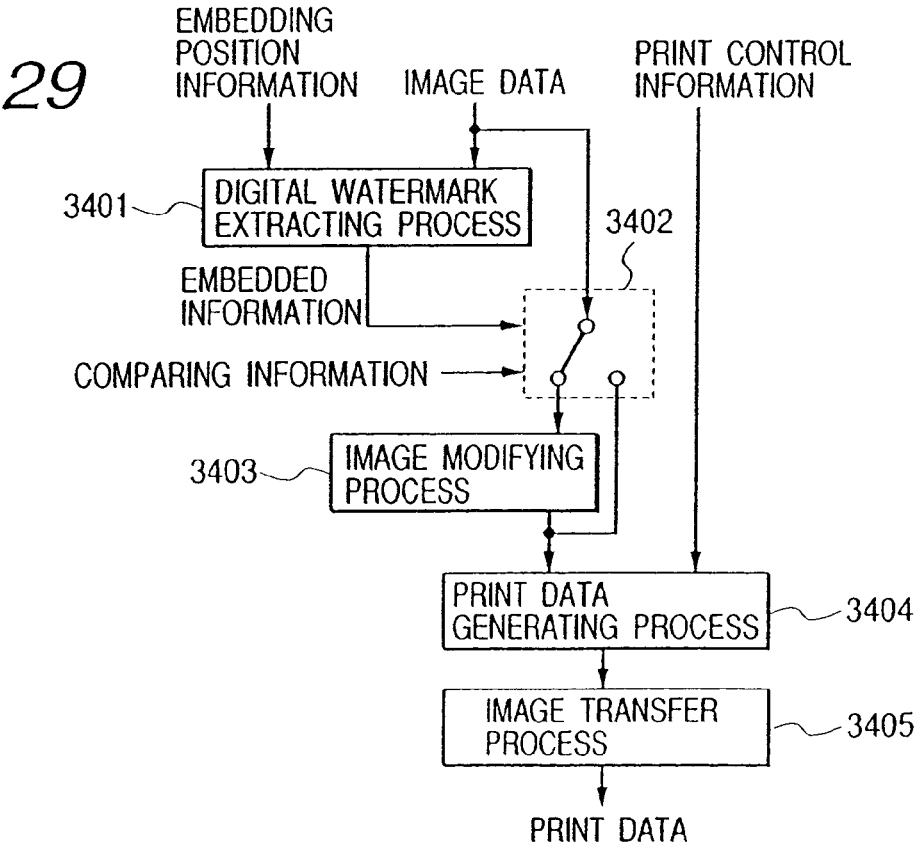
FIG. 29 is a diagram showing the process performed by a data output controller according to a seventeenth embodiment of the present invention.

FIG. 29 is a diagram showing the processing performed by a printer driver 3105 according to a seventeenth embodiment of the present invention. This processing includes: a digital watermark extracting process 3401, performed by a digital watermark extracting unit 3106; a switching process 3402, performed by a judging unit 3107 in order to employ embedded information to determine whether image data should be transmitted to an image modifying process 3403; the image modifying process 3403, performed by an image modifying unit 3108; a print data generating process 3404, performed by a print data generating unit 3109; and an image transfer unit 3405, performed by an image transfer unit 3110. The individual processes 3403 to 3405 are the same as the processes 3201 to 3204 in FIG. 27.

Assume that embedded information extracted during the digital watermark extracting process 3401 indicates the serial number of a printer driver. In the switching process 3402, when the serial number matches the serial number of the pertinent printer driver 3105, the image data are transmitted to the print data generating process 3404. When the two serial numbers do not match, the image data are transmitted to the image modifying process 3403.

In this embodiment, the serial number of the printer driver is employed as embedded information. However, this embodiment includes a method whereby a user ID extracted as embedded information is compared with a user ID that is read from a storage device, such as a card reader, connected to the computer terminal 3101, or that is entered via an input device, such as a keyboard, connected to the computer terminal 3101.

Further, as an example, in the image modifying process 3403, frequency conversion is performed, and inverse frequency conversion is performed for the obtained value by using a low pass filter, so that the resolution of an image is lowered. The image processing method is described in detail in "Guide to Digital Image Processing", Koichi Sakai, Corona Co., Ltd. A method for changing a resolution setup command for print control information can be employed as a method for reducing the resolution only of print data. In addition, it is easy to construct a device that performs an image modifying process 3403 other than the reduction of the resolution, i.e., performs addition of noise, filtering or color changing.

Furthermore, in the image modifying process 3403, embedding of a visible watermark, scrambling or encryption can be performed. These are merely examples, and other image changes are included in the above described processing. To embed a visible digital watermark, in the image modifying process 3403, positional information that is represented by a coordinate value for specifying the location of a visible watermark is obtained from part of the embedding information that is stored in the printer driver 3105, and a visible watermark is embedded by changing the luminance value of the location that is specified by the positional information.

To perform scrambling, in the image modifying process 3403, key information is obtained that is stored in the printer driver 3105, or that is extracted as embedded information, to indicate a pixel switching location. In accordance with the key information, scrambling is performed by switching the locations of pixel values of image data. To perform encryption, pixel values of image data are encrypted by using key information as employed for scrambling. The available encryption system is the common key encryption system, such as DES, or the public key encryption system, such as RSA (for a detailed discussion of these encryption systems, refer to "Guide to Cryptography Theory", Eiji Okamoto, Kyoritsu Publishing Co., Ltd.).

(Eighteenth Embodiment)

FIG. 30 is a diagram showing the processing performed by a printer driver 3105 according to an eighteenth embodiment of the present invention. This processing includes: a digital watermark extracting process 3501, performed by the digital watermark extracting unit 3106; a print data generating process 3502, performed by a print data generating unit 3109 to generate print data in accordance with image data and print control information; a switching process 3503, performed by a judging unit 3107 to employ embedded information to determine whether image data should be transmitted to an image modifying process 3504; the image modifying process 3504, performed by an image modifying unit 3108; and an image transfer process 3505, performed by an image transfer unit 3110. The watermark extracting process 3501, the print data generating process 3502 and the image transfer process 3505 are the same as the watermark extracting process 3201, the print data generating process 3203 and the image transfer process 3204 in FIG. 27.

The image data generated by an application software 3102 are transmitted to the print data process 3502 with print control information, such as a paper size for printing image data, and print data are generated. In the switching process 3503, the obtained print data are transmitted to either the image modifying process 3504 or the image transfer process 3505. Assume that the embedded information extracted during the watermark extracting process 3501 is the serial number of a printer driver. In the switching process 3503, when the serial number matches the serial number of the pertinent printer driver 3105, the print data are transmitted to the image transfer process 3505. When the two serial numbers do not match, the print data are transmitted to the image modifying process 3504.

In this embodiment, the serial number of the printer driver is employed as embedded information. However, this embodiment includes a method whereby a user ID extracted as embedded information is compared with a user ID that is read from a storage device, such as a card reader, connected to the computer terminal 3101, or that is entered via an input device, such as a keyboard, connected to the computer terminal 3101.

In the image modifying process 3504, the print data are modified. For example, a print mode setup command for the print data is changed to a draft printing command. In this embodiment, the print mode change processing is performed as an example; however, changing of another print command, or another means, such as density correction, luminance correction or gamma correction, may be performed. During the image transfer process 3505, the modified print data are transmitted to the print device 3112 and printed.

(Nineteenth Embodiment)

FIG. 31 is a diagram showing the processing performed by a printer driver 3105 according to a nineteenth embodiment of the present invention.

This processing includes: a digital watermark extracting process 3601, performed by the digital watermark extracting unit 3106; a judging process 3602 and a switching process 3603, performed by a judging unit 3107; an image modifying process 3604, performed by the image modifying unit 3108; a print data generating process 3605, performed by a print data generating unit 3109; and an image transfer process 3606, performed by an image transfer unit 3110. The watermark extracting process 3601, the print data generating process 3605 and the image transfer process 3606 are the same as the watermark extracting process 3201, the print data generating process 3203 and the image transfer process 3204 in FIG. 27.

In the watermark extracting process 3601, a scrambling cancel key, such as replacement information for pixels, is extracted as a watermark from image data that have been scrambled. The extracted scrambling cancel key is transmitted to the judging process 3602 to determine whether the key has been extracted correctly.

An example of the judging process 3602 will now be explained. Generally, a method is employed for repetitively embedding information as a digital watermark and for employing a majority decision to determine whether extracted information is correct. According to this method, a threshold value is set as the number of different data sets. If the number of different data sets exceeds the threshold value, it is ascertained that the correct key can not be extracted. This method is merely an example, and another determination method may be used for employing a serial number that is embedded with a key.

The image data are also transmitted to the switching process 3603. During the switching process 3603, image data are transmitted to the image modifying process 3604 when it is determined by the judging process 3602 that the correct scrambling cancel key can be extracted. When it is ascertained during the judging process 3602 that the correct scrambling cancel key can not be extracted, the image data are transmitted to the print data generating process 3605: During the image modifying process 3604, the scramble cancel key extracted by the watermark extracting process 3601 is employed to cancel the scrambling of image data, and the resultant image data are transmitted to the print data generating process 3605. During the print data generating process 3605, print data are generated, and during the image transfer process 3606, the print data are transmitted to the print device 3112.

(Twentieth Embodiment)

Figure 32:
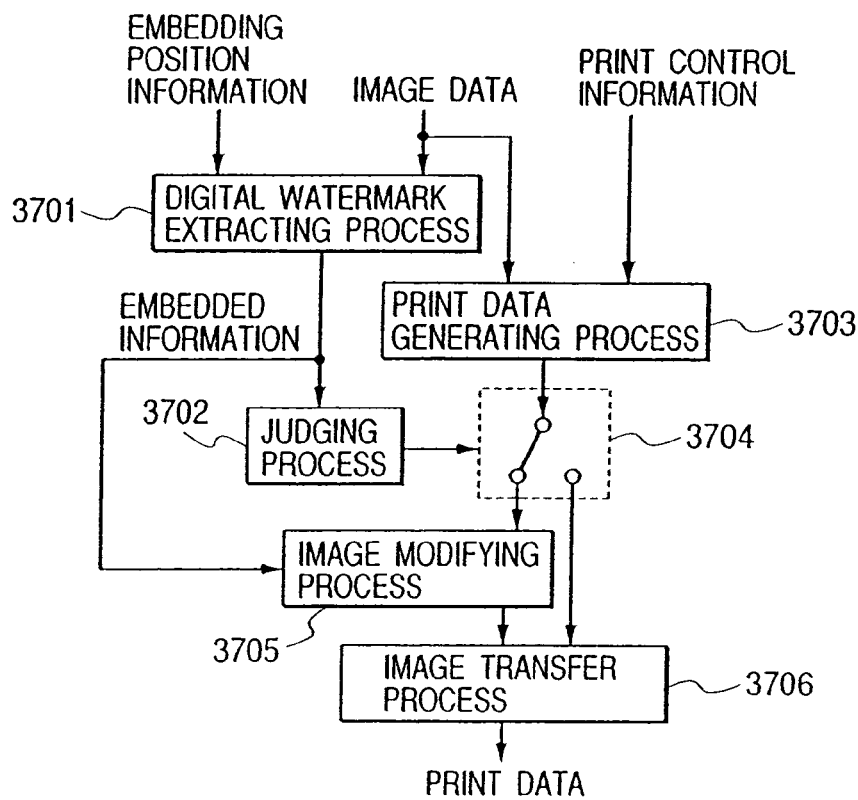
FIG. 32 is a diagram showing the process performed by a data output controller according to a twentieth embodiment of the present invention.

FIG. 32 is a diagram showing the processing performed by a printer driver 3105 according to a twentieth embodiment of the present invention.

This processing includes: a digital watermark extracting process 3701, performed by the digital watermark extracting unit 3106; a judging process 3702 and a switching process 3703, performed by a judging unit 3107; a print data generating process 3703, performed by a print data generating unit 3109; an image modifying process 3705, performed by the image modifying unit 3108; and an image transfer process 3706, performed by an image transfer unit 3110. The watermark extracting process 3701, the print data generating process 3703 and the image transfer process 3706 are the same as the watermark extracting process 3201, the print data generating process 3203 and the image transfer process 3204 in FIG. 27.

During the watermark extracting process 3701, a scrambling cancel key, such as replacement information for pixels, is extracted as a watermark from image data that have been scrambled. The extracted scrambling cancel key is transmitted to the judging process 3702 to determine whether the key has been correctly extracted.

An example of the judging process 3702 will now be explained. Generally, a method is employed for repetitively embedding information as a digital watermark and for employing a majority decision to determine whether extracted information is correct. According to this method, a threshold value is set for the number of different data sets. If the number of different data sets exceeds the threshold value, it is ascertained that the correct key can not be extracted. This method is merely an example, and there are other determination methods for employing copyright information that is embedded as a determination data string together with the scramble cancel key, which is embedded information.

The image data are transmitted with the print control information to the print data generating process 3703, and print data that are still slightly scrambled are generated. During the switching process 3704, the print data are transmitted to the image modifying process 3705 when it is ascertained by the judging process 3702 that the correct scramble cancel key can be extracted. When it is ascertained by the judging process 3702 that the correct scrambling cancel key can not be extracted, the image data are transmitted to the image transfer process 3706. During the image modifying process 3705, the scramble cancel key extracted by the watermark extracting process 3701 is employed to cancel the scrambling that remains in the image data, and the resultant image data are transmitted to the image transfer process 3706. During the image transfer process 3706, the image data are transferred to the print device 3112.

In this embodiment, the scrambling is performed as an image modifying process; however, another process, such as encryption, may be performed.

Furthermore, the printing system can be included not only on the print controller (printer driver) that is employed as an example in this embodiment, but also in another data output controller, such as a display driver, that controls an output device, an external storage device, such as a hard disk, or an output controller that controls an input/output port. One part of the functions of the data output controller may be incorporated in the output device.

(Twenty-first Embodiment)

Figure 33:
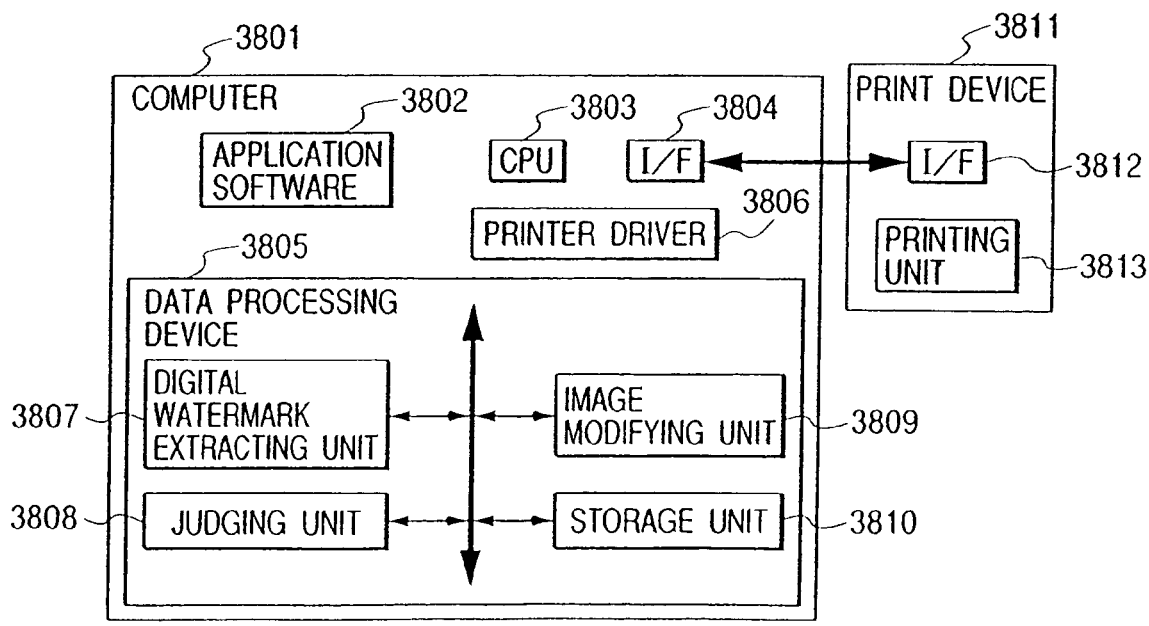
FIG. 33 is a diagram for explaining a printing system according to a twenty-first embodiment of the present invention.

FIG. 33 is a schematic diagram illustrating the arrangement of a printing system that is constituted by the data processing device according to the sixteenth embodiment and a printer driver that is a general data output controller.

The printing system comprises a computer terminal 3801, and a print device 3811 connected to the computer terminal 3801.

The computer terminal 3801 includes: an application software program 3802, which has as a function the processing of an externally obtained image; a CPU 3803, which reads and executes individual programs; an interface (I/F) 3804, which transfers print data to the print device 3811; a printer driver 3805 according to this invention; and a printer driver 3806, which converts, into print commands for the print device 3811, image data that are generated by the application software 3802 and image data that are modified by the data processing device 3805.

The data processing device 3805 includes: a digital watermark extracting unit 3807, which extracts a digital watermark from image data that are generated by the application software 3802; a judging unit 3808, which analyzes embedded information that is extracted from the image data by the watermark extracting unit 3807 and which controls an image modifying unit 3809 and/or a transmission source for the image data; the image modifying unit 3809, which performs an image modifying process, including image data correction, such as color correction, an embedding/or canceling process for a visible digital watermark, encryption and/or decryption, and scrambling and/or the canceling of scrambling; and a storage unit 3810, in which intermediate calculation results for the individual processes are stored temporarily, as needed.

The print device 3811 includes: an I/F 3812, which receives print data from the computer terminal 3801; and a printing unit 3813, which prints the print data received by the I/F 3812.

In accordance with embedding positional information that indicates the location whereat a digital watermark is embedded, the digital watermark extracting unit 3807 obtains information that is embedded as a watermark in image data that are received from a peripheral device, such as an input device or a storage device, connected to the computer terminal 3801, or in image data that are generated/edited by the application software 3802. The digital watermark extracting unit 3807 may extract embedded information, without receiving embedding positional information.

(Twenty-second Embodiment)

Figure 34:
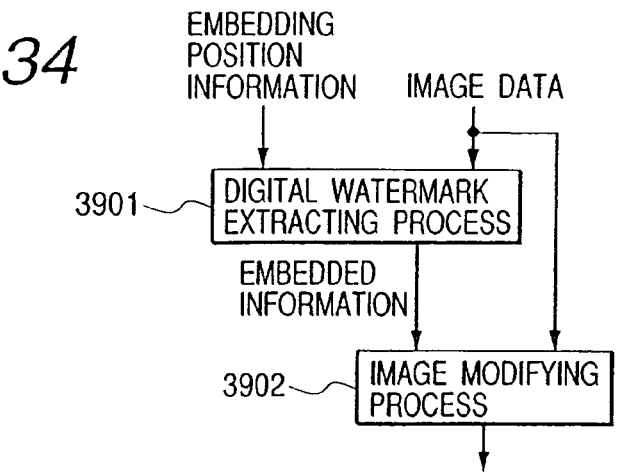
FIG. 34 is a diagram for explaining the process performed by a data output controller according to a twenty-second embodiment of the present invention.

FIG. 34 is a block diagram showing the processing performed by a data processing device 3805 according to a twenty-second embodiment of the present invention. This processing includes: a digital watermark extracting process 3901, performed by a digital watermark extracting unit 3807; and an image modifying process 3902, performed by an image modifying unit 3809. The watermark embedding extracting process 3901 and the image modifying process 3902 are the same as the processes 3201 and 3202 in FIG. 27.

During the watermark extracting process 3901, the embedded information is extracted from image data and are transmitted to the image modifying process 3902. Here, the embedded information is image density correction data. Image data are also transmitted with the embedding information to the image modifying process 3902. During the image modifying process 3202, image data are modified by adding embedding information (density correction data) to an image density value.

In this embodiment, density correction is performed as an example. However, as the above processing, another correction means, such as luminance correction or gamma correction, may be performed. The image data modified by the image modifying process 3902 are transmitted to the print driver 3806. Print data are generated by the print driver 3806 and are printed by the print device 3811.

(Twenty-third Embodiment)

Figure 35:
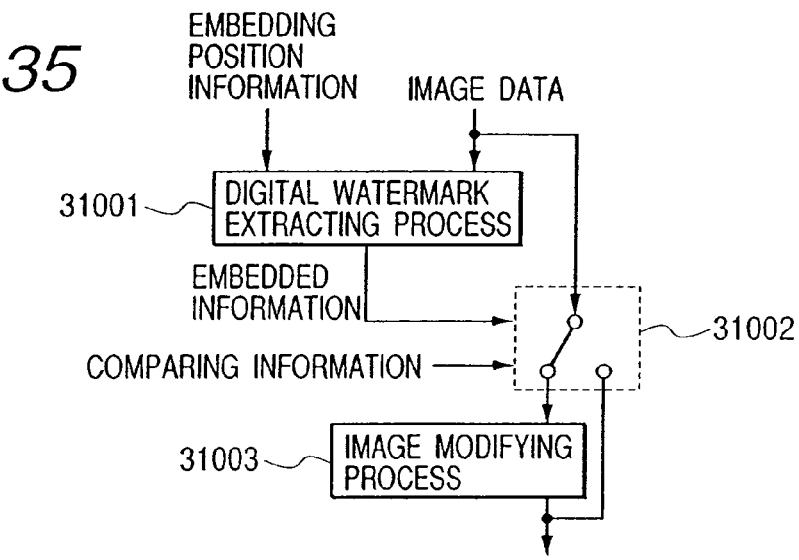
FIG. 35 is a diagram for explaining the process performed by a data output controller according to a twenty-third embodiment of the present invention.

FIG. 35 is a block diagram showing the processing performed by a data processing device 3805 according to a twenty-third embodiment of the present invention. This processing includes: a digital watermark extracting process 31001, performed by a digital watermark extracting unit 3807; a switching process 31002, performed by a judging unit 3808 to employ embedded information to determine whether image data should be transmitted to an image modifying process 31003; and the image modifying process 31003, performed by an image modifying unit 3809. The watermark embedding extracting process 31001, the switching process 31002 and the image modifying process 31003 are the same as the processes 3401, 3402 and 3403 in FIG. 29.

During the switching process 31002, the embedded information extracted by the extracting process 31001 is employed to determine whether the image data are to be output unchanged to the printer driver 3806, or are to be transmitted to the image modifying process 31003. If, for example, the embedded information is the serial number of a printer driver, during the switching process 31002, the image data are output to the printer driver 3806 when the serial number matches the serial number included in the data processing device 3805. When the two serial numbers do not match, the image data are transmitted to the image modifying process 31003.

In this embodiment, the serial number of the printer driver is employed as embedded information. However, this embodiment includes a method whereby a user ID that is extracted as embedded information is compared with a user ID that is read from a storage device, such as a card reader, connected to the computer terminal 3801, or that is entered via an input device, such as a keyboard, connected to the computer terminal 3801. In addition, when the image data are transmitted to the image modifying process 31003, the image data are modified and the resultant image data are output to the printer driver 3806.

(Twenty-fourth Embodiment)

Figure 36:
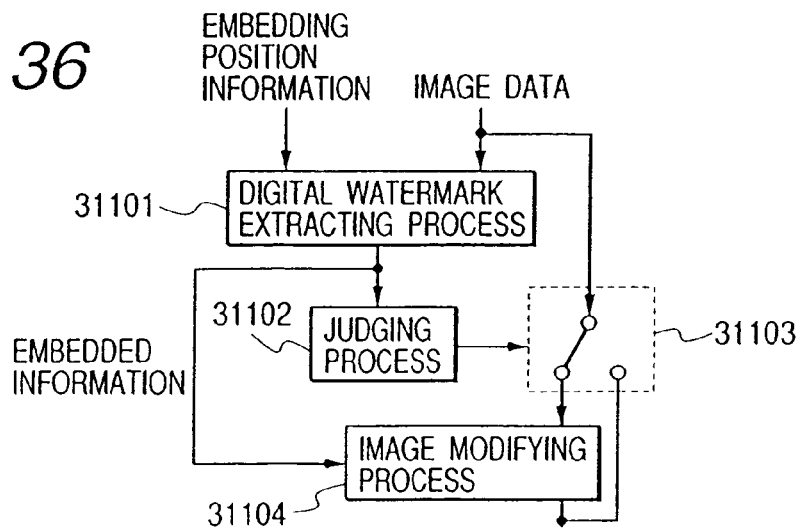
FIG. 36 is a diagram for explaining the process performed by a data output controller according to a twenty-fourth embodiment of the present invention.

FIG. 36 is a diagram showing the processing performed by a printer driver 3105 according to a twenty-fourth embodiment of the present invention. This processing includes: a digital watermark extracting process 31101, performed by a digital watermark extracting unit 3807; a judging process 31102 and a switching process 31103, performed by a judging unit 3808; and an image modifying process 31104, performed by an image modifying unit 3809. The watermark extracting process 31101, the judging process 31102, the switching process 31103 and the image modifying process 31104 are the same as the watermark extracting process 3601, the judging process 3602, the switching process 3603 and the image modifying process 3604 in FIG. 31.

During the watermark extracting process 31101, a scrambling cancel key, such as replacement information for pixels, is extracted as a watermark from image data that have been scrambled. The extracted scrambling cancel key is transmitted to the judging process 31102 to determine whether the key has been correctly extracted. The image data are also transmitted to the switching process 31103.

During the switching process 31103, image data are transmitted to the image modifying process 31104 when it is determined by the judging process 31102 that the correct scrambling cancel key can be extracted. When it is ascertained by the judging process 31102 that the correct scrambling cancel key can not be extracted, the image data are transmitted unchanged to the printer driver 3806. During the image modifying process 31104, the scramble cancel key extracted by the watermark extracting process 31101 is employed to cancel the scrambling of the image data, and the resultant image data are output.

In this embodiment, as an image modifying process, the scrambling is performed; however, another process, such as encryption, may be performed.

Further, in this embodiment, a printing system is employed that uses the data processing device and the printer driver. However, the printing system can be easily constructed by using a data output controller other than the printer driver, and can be applied for another output control system.

(Twenty-fifth Embodiment)

Figure 37:
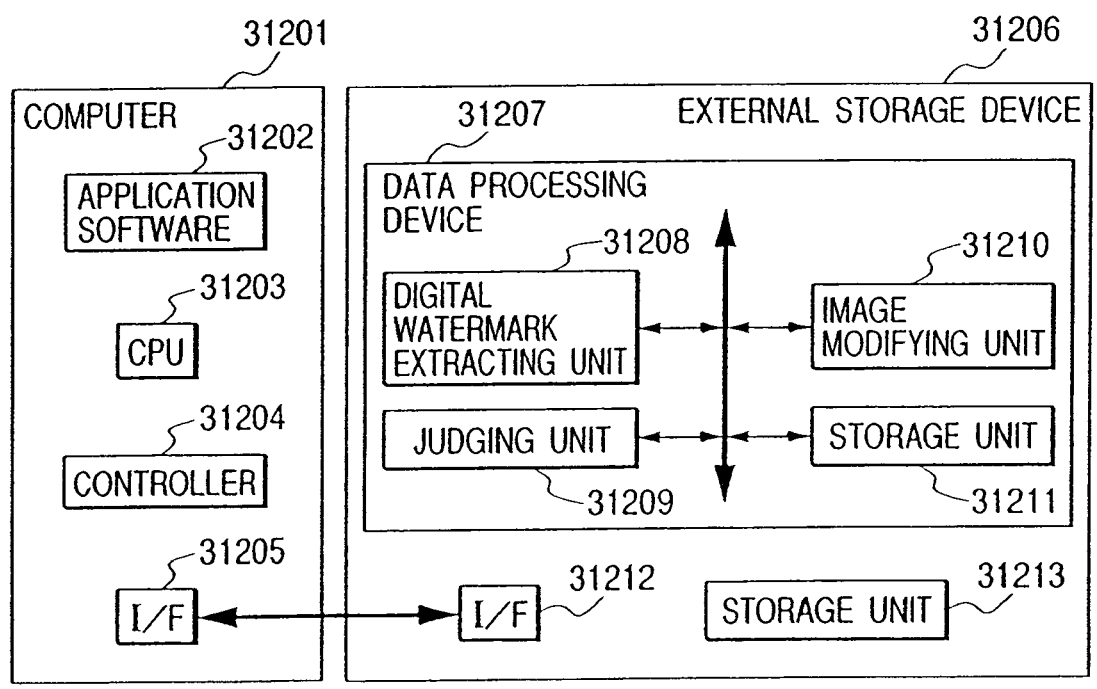
FIG. 37 is a diagram for explaining a printing system according to a twenty-fifth embodiment of the present invention.

FIG. 37 is a block diagram illustrating a system wherein the data processing device of the seventeenth embodiment is mounted in an external storage device.

This system comprises an external storage device 31206, and a computer terminal 31201 connected to the external storage device 31206.

The computer terminal 31201 includes: an application software program 31202, which has as a function the processing of an externally obtained image; a CPU 31203, which reads and executes individual programs stored in the computer terminal 31201; a controller 31204, which controls the transmission of data to the external storage device 31206 or the loading of data from the external storage device 31206; and an interface (I/F) 31204, which exchanges data with the external storage device 31206.

The external storage device 31206 includes: a data processing device 31207; an IF 31212, which receives data from the computer terminal 31201; and a storage unit 31213, which stores, on an external storage medium, data obtained through the I/F 31212 and data modified by the data processing device 31207.

The data processing device 31207 includes: a digital watermark extracting unit 31208, which extracts a digital watermark from image data that are received by the external storage, device 31206; a judging unit 31209, which analyzes embedded information that is extracted from the image data by the watermark extracting unit 31208 and which controls an image modifying unit 31210 and/or a transmission source for the image data; the image modifying unit 31210, which performs an image modifying process, including image data correction, such as color correction, an embedding/or canceling process for a visible digital watermark, encryption and/or decryption, and scrambling and/or the canceling of scrambling; and a storage unit 31211, in which intermediate calculation results for the individual processes are stored temporarily, as needed.

In accordance with embedding positional information that indicates the location whereat a digital watermark is embedded, the digital watermark extracting unit 31208 obtains, from the image data that are received from the external storage device 31206, information that is embedded as a watermark. The digital watermark extracting unit 31208 may also extract embedded information, without receiving embedding positional information.

The data processing device 31207 is operated in the same manner as are one of the data processing devices shown in FIGS. 34, 35 and 36.

In this embodiment, the data processing device is mounted in the storage device; however, it can easily be mounted in a communication device, a print device, and a display device, or included as part of the application software.

(Modification)

The present invention includes not only a device and a method for performing the processing in the above embodiments, but also includes a storage medium on which a computer-readable control program for the processing is stored.

The storage medium will now be described.

The systems shown in FIGS. 26, 33 and 37 can be constructed by using hardware or by using a computer system that comprises a CPU and a memory. If the system is constructed by using a computer system, the memory of the computer system serves as the storage medium according to the present invention. On this storage medium, a program is stored which performs the processes shown in the previously described drawings.

The storage medium can be, for example, a semiconductor memory, such as a ROM or a RAM, an optical disk, a magneto-optical disk, a magnetic storage medium, a CD-ROM, an FD, a magnetic card, a magnetic tape, or a nonvolatile memory card.

Therefore, when the storage medium is employed by a system or an apparatus other than the system in the above embodiments, and when program code stored in the storage medium is read and executed by the system or the computer, the same effects can be obtained, and the functions in the above embodiments and the objective of the present invention can also be implemented.

Furthermore, the present invention includes a case wherein program code, read from a storage medium, is written in a memory that is mounted on a function expansion board inserted into a computer, or in a function expansion unit connected to a computer, and in consonance with a program code instruction, a CPU mounted on the function expansion board or in the function expansion unit performs a part, or all, of the actual processing in order to obtain the effects acquired above, and to implement the functions provided by the above described embodiments and the objective of the present invention.

According to the above described embodiments, since digital contents or data output by an output device are controlled in accordance with a digital watermark that is embedded in the digital contents, whether the digital contents are to be output in the normal state can be altered, and an accounting system, etc., can be applied.

As described above, according to the present invention, an illegal act involving digital contents can be prevented or detected.

What is claimed is:

1. A data processing apparatus comprising:
an input unit adapted to input a file that contains (i) digital contents in which a creation time of the digital contents was embedded as a digital watermark and (ii) an update time of the digital contents, wherein the update time is a time which is updated when a process is executed on the digital contents;
an extraction unit adapted to extract the creation time from the digital contents, and further to extract the update time from the file; and
a judgment unit adanted to compare the extracted creation time and the extracted update time with each other, and to judge, according to a compared result, whether or not an illegal process was executed on the digital contents.

2. A data processing apparatus according to claim 1, wherein said judgment unit judges that the illegal process was executed on the digital contents, in a case where a difference between the extracted creation time and the extracted update time is larger than a predetermined threshold.

3. A data processing method comprising:
an input unit adapted to input a file that contains (i) digital contents in which a creation time of the digital contents was embedded as a digital watermark and (ii) an update time of the digital contents, wherein the update time is a time which is updated when a process is executed on the digital contents;
an extraction unit adapted to extract the creation time from the digital contents, and further to extract the update time from the file; and
a judgment unit adapted to compare the extracted creation time and the extracted update time with each other, and to judge, according to a compared result, whether or not an illegal process was executed on the digital contents.

4. A data processing method according to claim 3, wherein said judgment step judges that the illegal process was executed on the digital contents, in a case where a difference between the extracted creation time and the extracted update time is larger than a predetermined threshold.

5. A computer-readable storage medium storing codes for a method comprising:
an input unit adapted to input a file that contains (i) digital contents in which a creation time of the digital contents was embedded as a digital watermark and (ii) an update time of the digital contents, wherein the update time is a time which is updated when a process is executed on the digital contents;
an extraction unit adapted to extract the creation time from the digital contents, and further to extract the update time from the file; and
a judgment unit adapted to compare the extracted creation time and the extracted update time with each other, and to judge to according to a compared result, whether or not an illegal process was executed on the digital contents.

6. An information processing system in which a digital watermark embedding device and an illegal process detection device are connected through a communication network, wherein:
said digital watermark embedding device comprises,
an embedding unit adapted to embed a creation time of digital contents in the digital contents as a digital watermark, and
a file creation unit adapted to create a file in which the digital contents and an update time of the digital contents are recorded, wherein the update time is a time which is updated when a process is executed on the digital contents; and said illegal process detection device comprises, an input unit adapted to input the file created by said file creation unit, an extraction unit adapted to extract the creation time from the digital contents, and further to extract the update time from the file, and a judgment unit adapted to compare the extracted creation time and the extracted update time with each other, and to judge, according to a compared result, whether or not an illegal process was executed on the digital contents.

* * * * *

UNITED STATES PATENT AND TRADEMARK OFFICE
CERTIFICATE OF CORRECTION

PATENT NO.       : 7,171,021 B2
APPLICATION NO.  : 11/078376
DATED            : January 30, 2007
INVENTOR(S)      : Jun Yoshida et al.

It is certified that error appears in the above-identified patent and that said Letters Patent is hereby corrected as shown below:

Fig. 1, "SERVVER" should read --SERVER--.

Figs. 2 and 18-24, "INJUSTICE" should read -- ILLEGALITY--.

Col. 1,   line 13, "in justice" should read --injustice--.

line 46, "the" (second occurrence) should be deleted.

Col. 5,   line 24, "to" should be deleted.

Col. 10,  line 58, "digital," should read --digital--.

Col. 13,  line 43, "its has a properties is that" should read --its properties is that--.

Col. 20,  line 10, "nothing" should read --no--.

Col. 22,  line 16, "3304,performed" should read --3304, preformed--.

Col. 30,  line 12, "adanted" should read --adapted--.

line 55, "to" (second occurrence) should be deleted.

Signed and Sealed this

Twenty-third Day of October, 2007

JON W. DUDAS
*Director of the United States Patent and Trademark Office*